June 8, 1937.  F. J. SHOOK  2,083,350
APPARATUS FOR WINDING TIRE BEADS
Original Filed June 1, 1934  14 Sheets-Sheet 1

Inventor
FLORAIN J. SHOOK
BY Albert L. Ely
Attorney

June 8, 1937. F. J. SHOOK 2,083,350
APPARATUS FOR WINDING TIRE BEADS
Original Filed June 1, 1934 14 Sheets-Sheet 2

Inventor.
FLORAIN J. SHOOK
BY Albert L. Ely
Attorney

June 8, 1937.  F. J. SHOOK  2,083,350
APPARATUS FOR WINDING TIRE BEADS
Original Filed June 1, 1934   14 Sheets-Sheet 3

Inventor
FLORAIN J. SHOOK
BY Albert L. Ely
Attorney

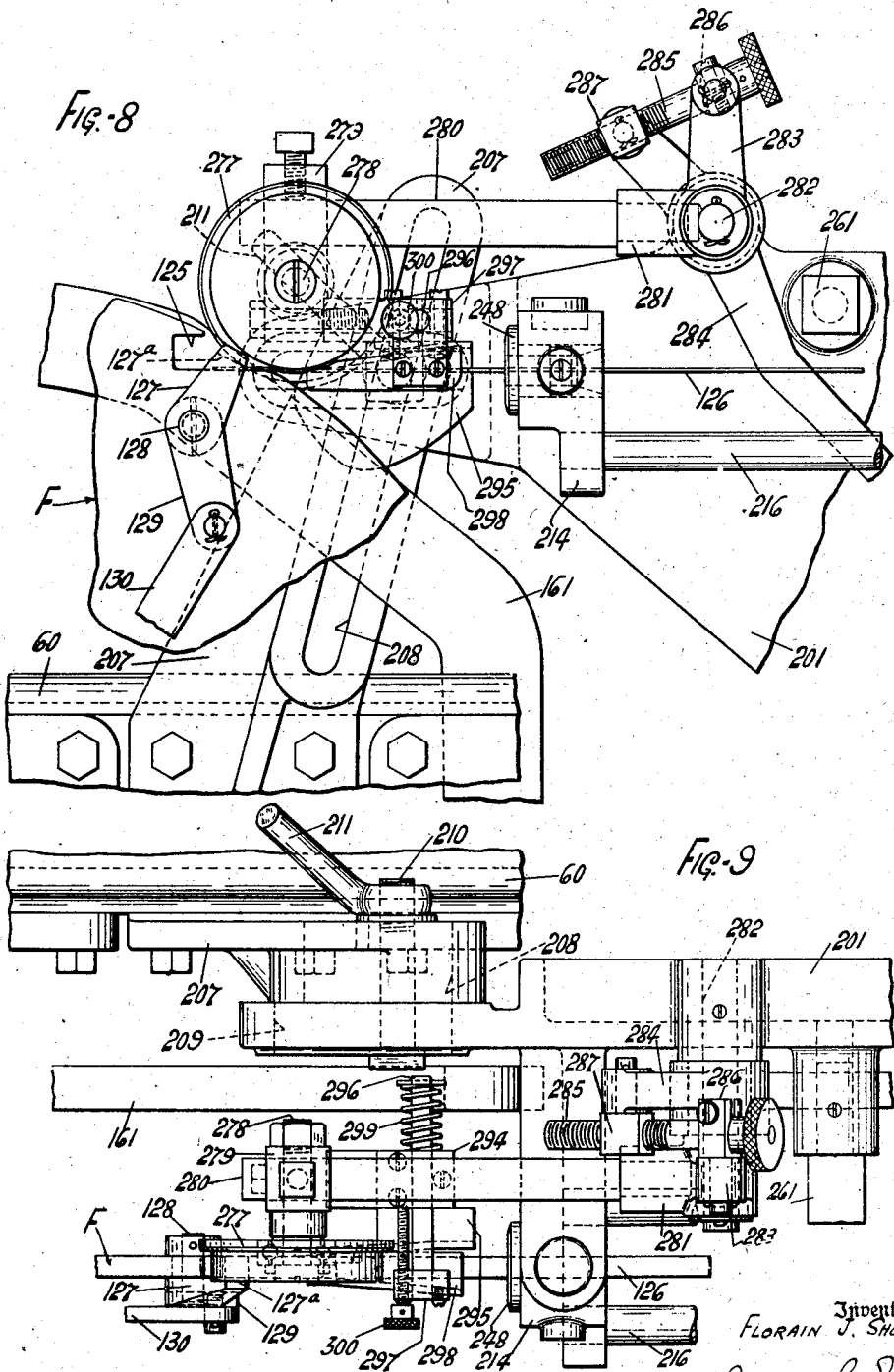

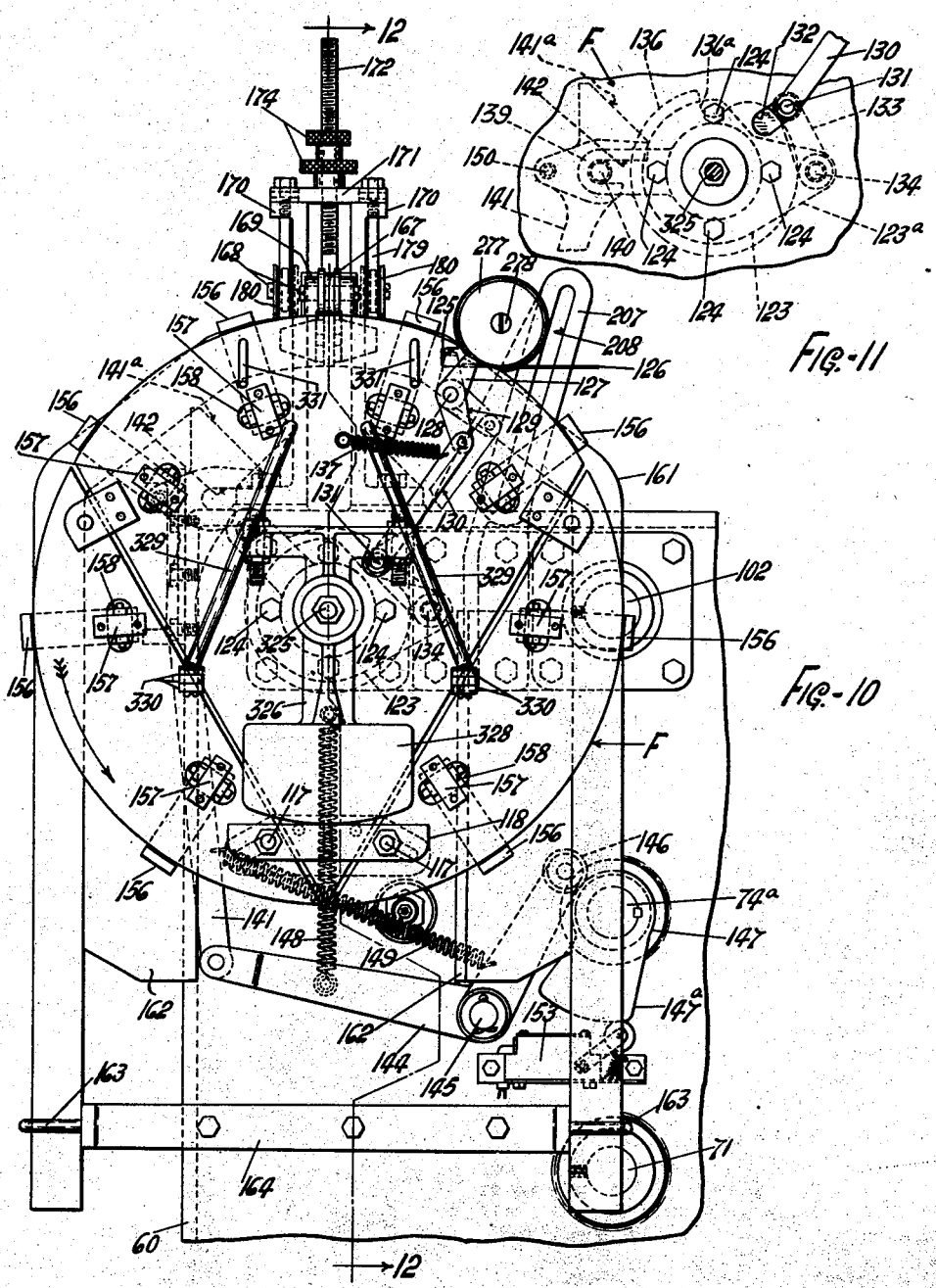

June 8, 1937. F. J. SHOOK 2,083,350
APPARATUS FOR WINDING TIRE BEADS
Original Filed June 1, 1934 14 Sheets-Sheet 8

Inventor
FLORAIN J. SHOOK
BY Albert L. Ely
Attorney

June 8, 1937.   F. J. SHOOK   2,083,350
APPARATUS FOR WINDING TIRE BEADS
Original Filed June 1, 1934   14 Sheets-Sheet 10

Inventor
FLORAIN J. SHOOK
BY Albert L. Ely
Attorney

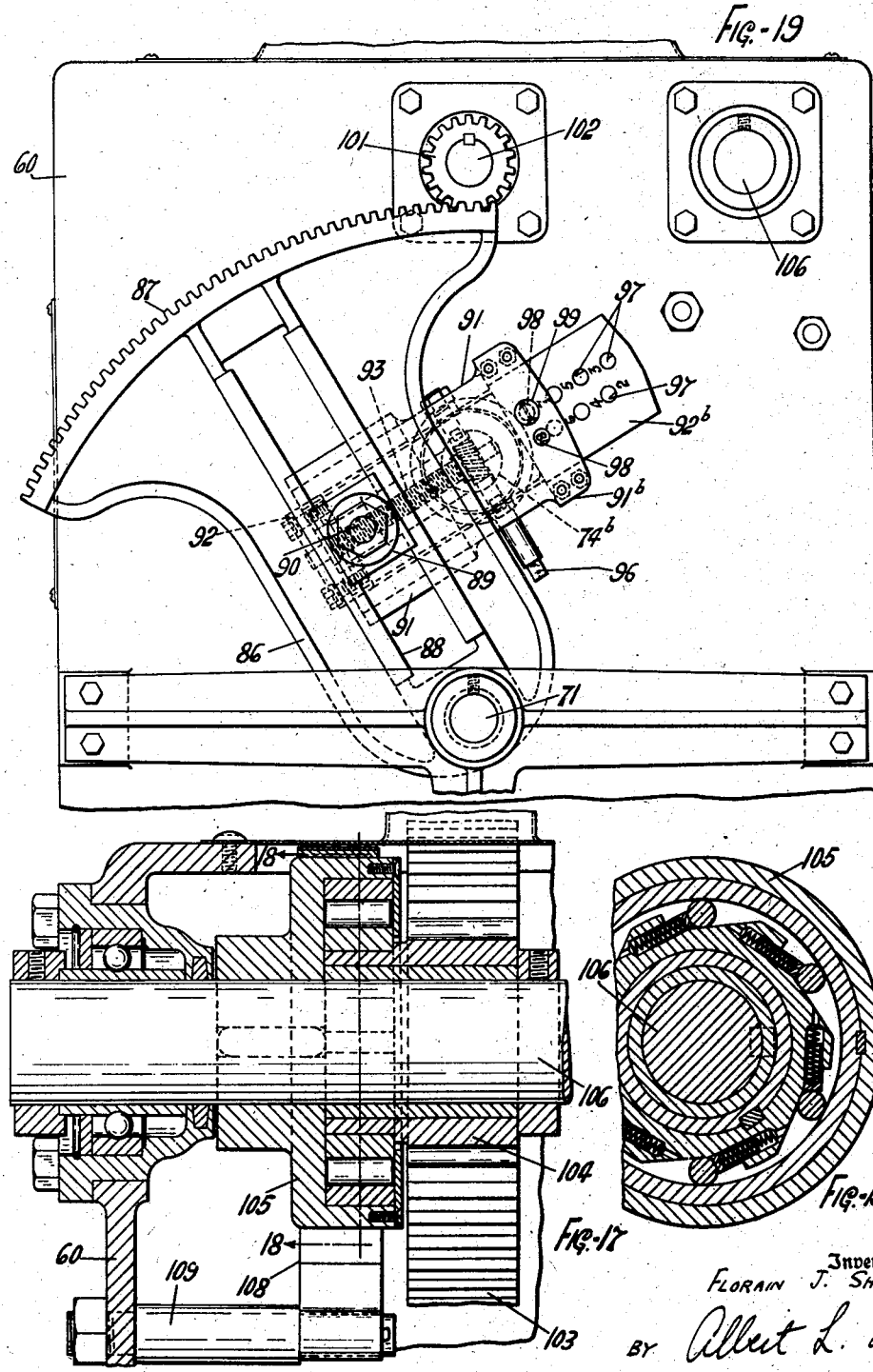

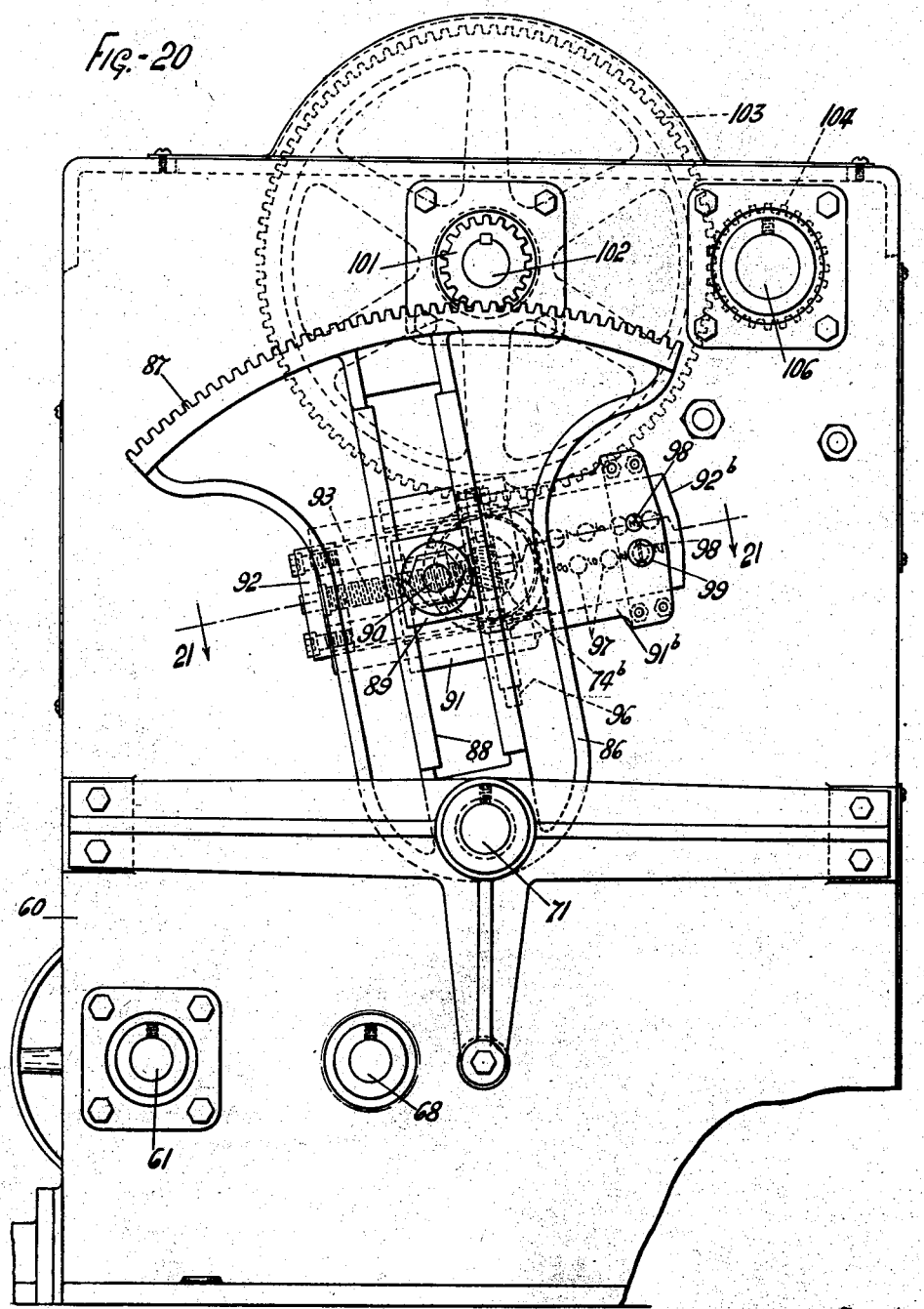

June 8, 1937. F. J. SHOOK 2,083,350
APPARATUS FOR WINDING TIRE BEADS
Original Filed June 1, 1934 14 Sheets-Sheet 13

Inventor
FLORAIN J. SHOOK
By Albert L. Ely
Attorney

June 8, 1937. F. J. SHOOK 2,083,350
APPARATUS FOR WINDING TIRE BEADS
Original Filed June 1, 1934 14 Sheets-Sheet 14
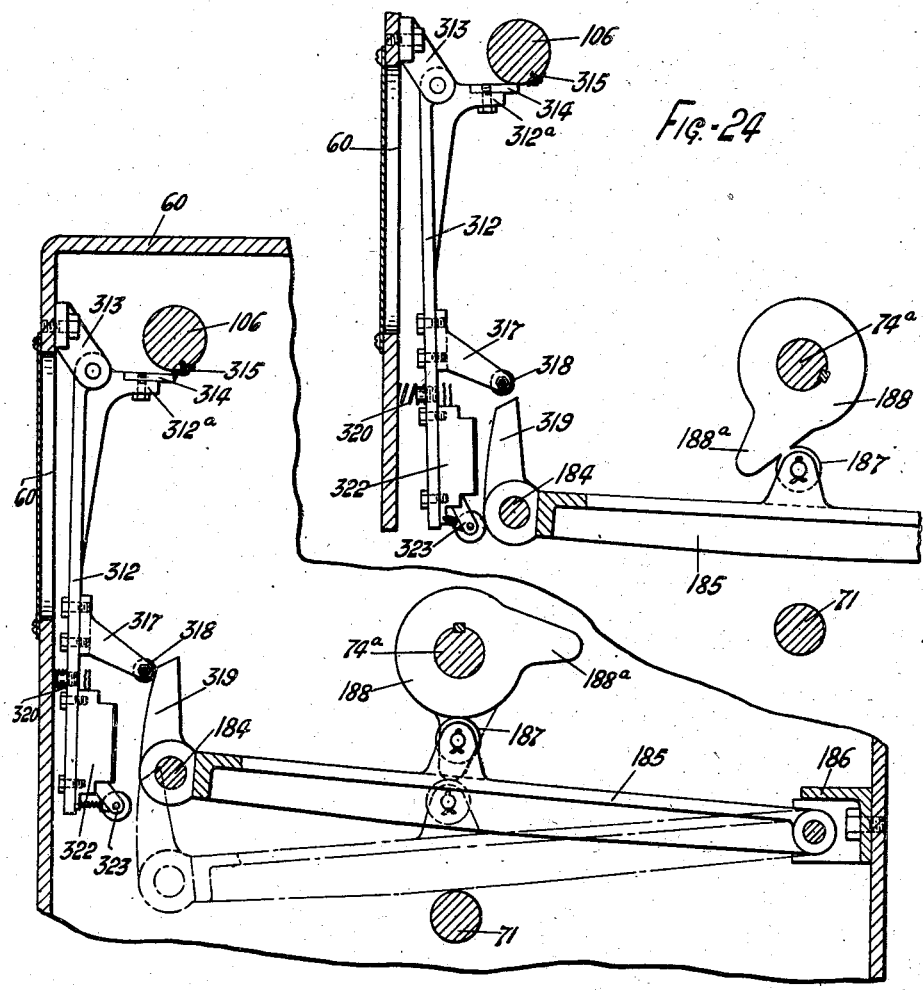
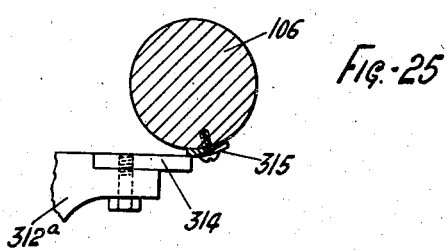
Inventor
FLORAIN J. SHOOK
BY Albert L. Ely
Attorney Patented June 8, 1937

2,083,350

UNITED STATES PATENT OFFICE 2,083,350

APPARATUS FOR WINDING TIRE BEADS

Florain J. Shook, Akron, Ohio, assignor to National-Standard Company, Niles, Mich., a corporation of Michigan Original application June 1, 1934, Serial No. 728,557. Divided and this application January 30, 1936, Serial No. 61,540

36 Claims. (Cl. 154—9)

This invention relates to apparatus for winding tire beads, and more especially it relates to apparatus for winding rubberized wire tape into a ring comprising a plurality of superposed convolutions, the finished structure constituting an inextensible bead core suitable for building into the lateral marginal portions of a pneumatic tire casing.

The chief objects of the invention are to increase production of bead cores of the character mentioned; to provide apparatus that is fully automatic in operation; to provide apparatus of low maintenance cost due to absence of jolts and jars during operation; to provide apparatus capable of making bead cores of various diameters and thickness with the minimum of alteration to the apparatus; to produce bead cores of the character mentioned wherein the respective ends of the wire tape accurately overlap each other; to provide for the production of loosely pressed or tightly compacted bead core structures; and to provide for the ejecting of the bead cores from the apparatus in determinate angular position to facilitate receiving of the bead cores by apparatus for performing subsequent operations thereon. Other objects will be manifest as the specification proceeds.

This application is a division of my copending application for Apparatus for making tire beads, Serial No. 728,557, filed June 1, 1934.

Of the accompanying drawings,

Figure 8 is an enlarged detail elevation of a portion of the mechanism shown in Figure 4, showing the bead tape guide and adjustable presser roller;

Figure 9 is a plan view of the structure shown in Figure 8;

Figure 10 is a front elevational detail, on a larger scale, of the mechanism at the left-hand end of Figure 1;

Figure 11 is a section on the line 11—11 of Figure 12, showing the position of certain parts when the gripper that engages the leading end of the rubberized tape is released;

Figure 17 is a section, on a larger scale, on the line 17—17 of Figure 15;

Figure 18 is a section on the line 18—18 of Figure 17;

Figure 19 is a fragmentary rear elevation of the winding unit showing a crank that drives the bead core form, said crank being adjusted for the production of bead cores consisting of 8 convolutions of wire tape;

Figure 20 is a view similar to Figure 19 showing the crank adjusted for the production of 3-ply bead cores;

Figure 23 is a section on the line 23—23 of Figure 12, the parts being shown in the relative positions they occupy in the normal operation of the apparatus;

Figure 24 is a view similar to Figure 23 showing the position of the parts when the apparatus is "out of time", that is, when the drive of the bead form is not in synchronism with mechanism for feeding the leading end of the tape to the form; and Figure 25 is an enlarged detail view of a small portion of the mechanism shown in Figures 23 and 24.

General description

The winding apparatus of this invention comprises a rotatable, generally circular bead form that is intermittently driven, for from 2 to 8 revolutions depending upon the character of the bead being built, to draw a continuous strip of rubberized wire tape onto its periphery. Means is provided for feeding the leading end of said wire tape to the form during the latter's periods of rest between rotative cycles, and also for severing the continuous tape from the wound structure as the form stops rotating after each winding operation. A suitable clamp carried by the form is provided for gripping the leading end of the wire tape, and said clamp is operated to release its grip after the bead core is wound. Means also is provided for ejecting the finished bead core from the periphery of the form progressively in such a manner that it falls therefrom in a determinate angular position so as better to be received by apparatus for performing subsequent operations thereon. The mechanisms mentioned operate automatically in determinate sequence to produce the result desired. Should the proper relative positions of the form and other mechanisms be altered, for a number of reasons subsequently to be explained, the machine will stop running and it cannot again be started until the mechanisms have been adjusted to their proper relative positions.

A series of forms of different diameters is provided for building bead cores characterized by major differences in diameter, but each form is adjustable circumferentially to provide for the manufacture of bead cores having but minor differences in diameter.

Form-rotating apparatus

Figures 1, 2, 3:
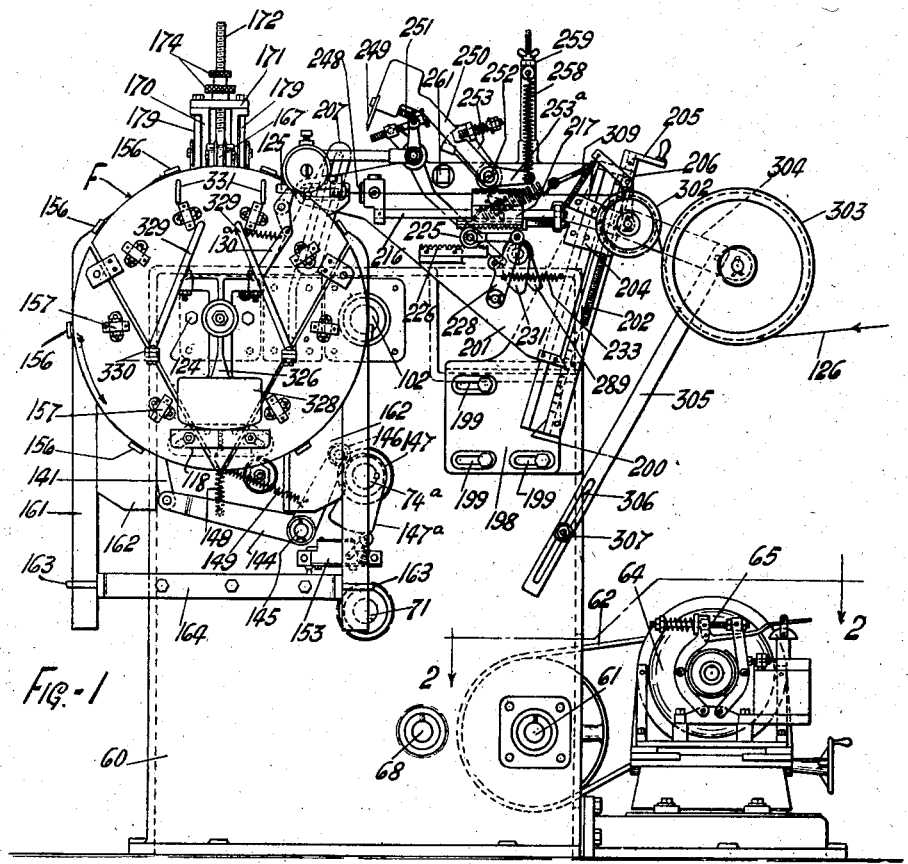
Figure 1 is a front elevation of the improved bead winding apparatus, in its preferred form, and the work therein, in the initial stage of operation for winding a bead core of three convolutions.
Figure 2 is a section on the line 2—2 of Figure 1, showing a variable speed drive device.
Figure 3 is a fragmentary portion of the mechanism shown in Figure 12, showing how a completely wound bead core is removed from the form on which it is built.

The winding apparatus comprises a suitable housing 60 near the bottom of which is journaled a main drive shaft 61 that is driven by belt 62 through a suitable variable speed drive device 63 associated with a constantly running electrical motor 64, the latter being provided with a magnetic brake 65, Figure 1. The drive shaft 61 carries a pinion 66 that is meshed with a gear 67 that is mounted upon an intermediate drive shaft 68 also journaled in housing 60, parallel to shaft 61. The intermediate shaft 68 carries a pinion 69 that is meshed with a gear 70 fixed on a countershaft 71, the latter also carrying a pinion 72 that is meshed with a gear 73 having driving connection with the rear section 74ᵇ of a two-part cam and crank shaft consisting of front and rear sections 74ᵃ, 74ᵇ respectively. The cam and crank shaft and countershaft are disposed in the same vertical plane, parallel to shafts 61 and 68. The gearing described is such as to reduce the motor speed so that the cam and crank shaft rotate at a maximum of 12 R. P. M.

Figure 12:
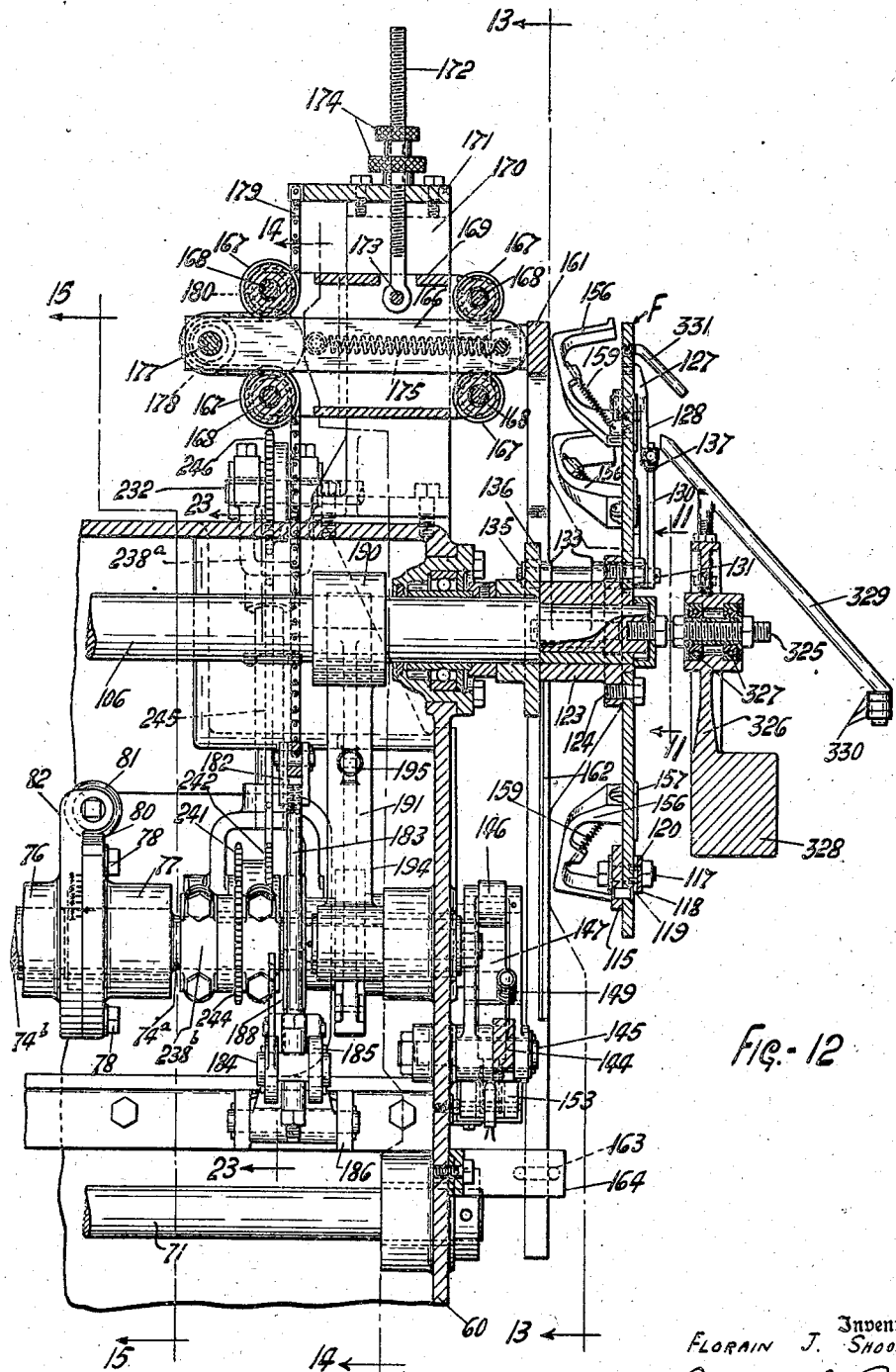
Figure 12 is a section on the line 12—12 of Figure 10, showing mechanism located at the front of the winder housing.
Figure 15:
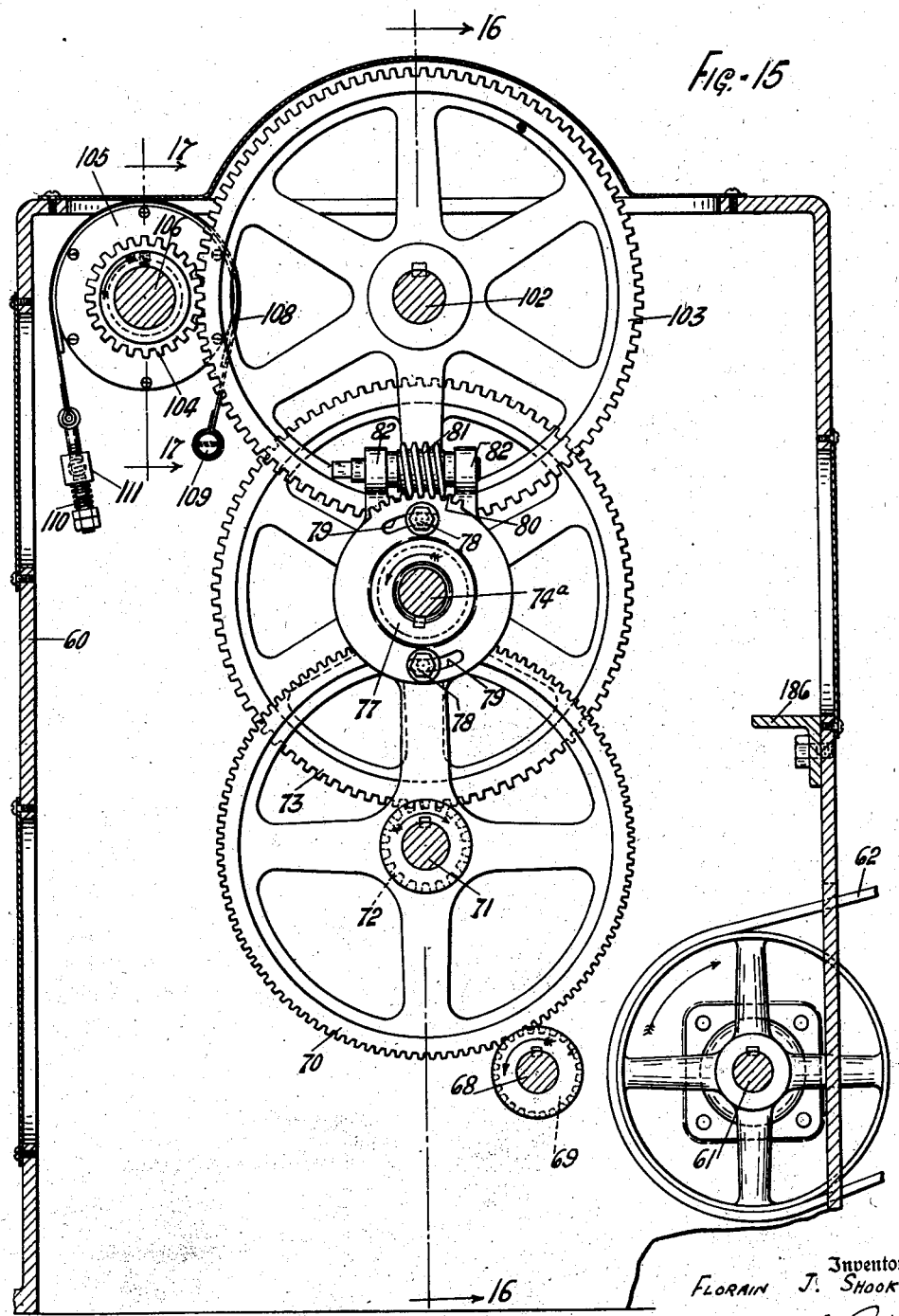
Figure 15 is a section on the line 15—15 of Figure 12 and Figure 16.
Figure 16:
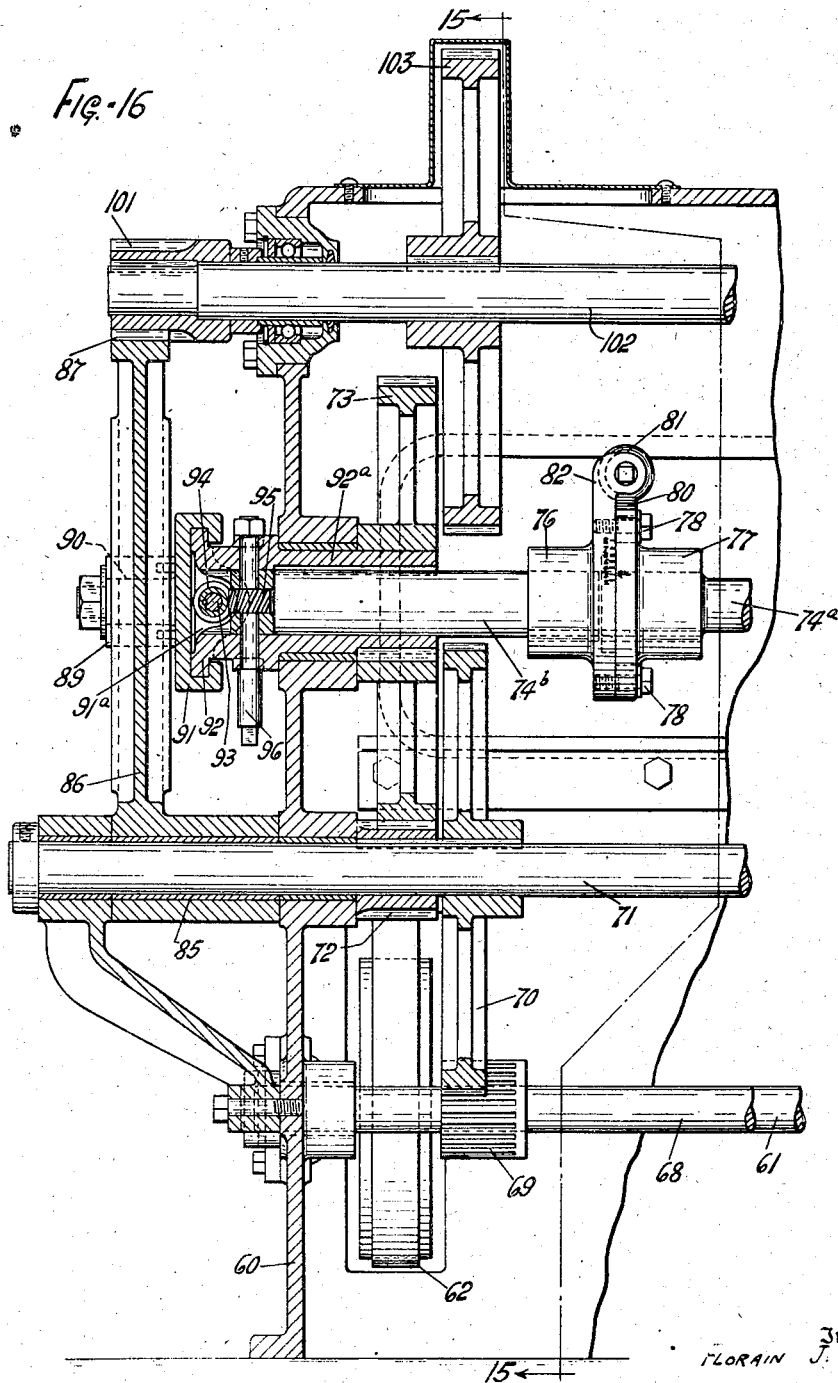
Figure 16 is a section on the line 16—16 of Figure 15.

The two sections of the cam and crank shaft are adjustable angularly relatively of each other for a purpose subsequently to be explained, and to this end a coupling member 76 is keyed to the inner end of shaft section 74ᵇ, and a coupling member 77 is keyed to the adjacent end of shaft section 74ᵃ. Said coupling members are secured to each other by bolts 78, 78 that extend through respective arcuate slots 79, Figure 15, in a circumferential flange on member 77 and are threaded into a similar flange on member 76. The said flange on member 77 is formed with a short segment of worm gear teeth 80, which teeth are meshed with a worm 81 journaled in suitable bracket arms 82 formed on the flange of member 76. The worm 81 has a projecting squared end that may be engaged by a suitable socket wrench, the arrangement being such that the coupling members 76, 77 and their respective shaft sections may be angularly adjusted, upon occasion, by the turning of worm 81 when bolts 78 are loosened. Such adjustment requires to be made only when the apparatus is changed to wind bead cores requiring a different number of convolutions of the wire tape, and suitable indicia may be stamped upon the perimeter of the coupling flanges, as shown in Figures 12 and 16, to indicate the proper relative positioning of the coupling members for winding bead cores of any number of convolutions from two to eight.

Figure 21:
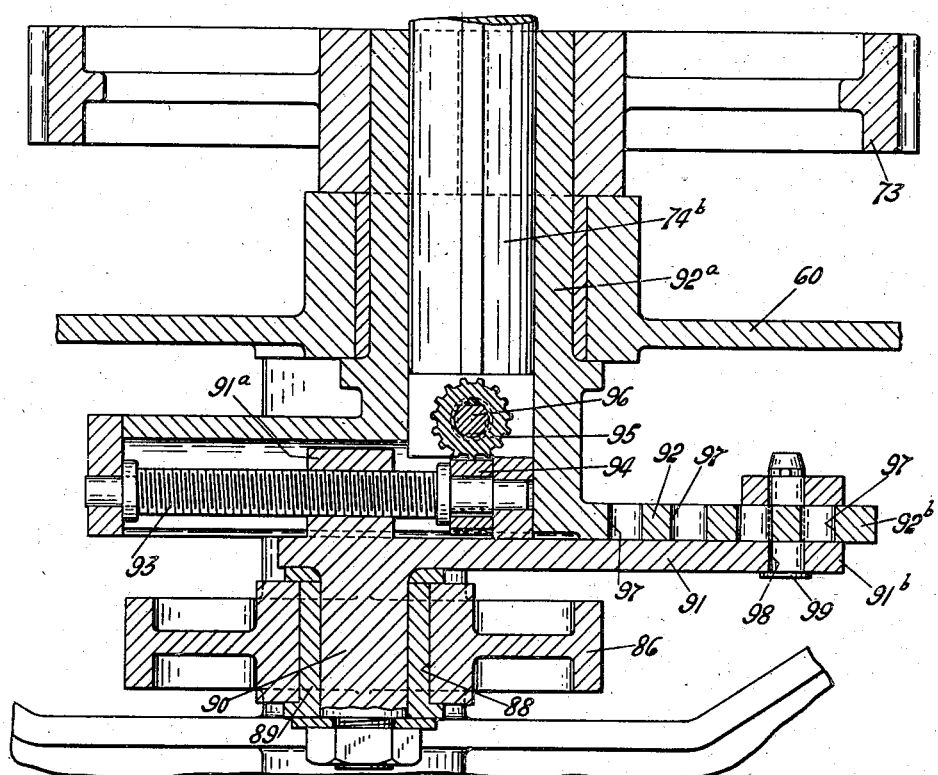
Figure 21 is a section on the line 21—21 of Figure 20.

The countershaft 71 extends through and beyond the rear wall of housing 60, the projecting portion of said shaft carrying a bushing 85 upon which is mounted a quadrant 86 that has its free end formed with a gear sector 87. The quadrant 86 is moved angularly or oscillated about countershaft 71 as a pivot by means of a crank arm connected to the cam and crank shaft section 74ᵇ, and to this end the quadrant is formed with a slot 88 that is radially disposed with relation to countershaft 71, said slot constituting a slideway for a slide-block 89. As is most clearly shown in Figure 21, the slide-block 89 is journaled upon a spindle 90 that is integral with and projects rearwardly from a slide 91 that is carried by a crank arm 92, the latter being formed with a hub portion 92ᵃ by means of which it is journaled in the housing 60, upon the rear end portion of cam and crank shaft section 74ᵇ to which it is keyed, said hub portion 92ᵃ having an extension upon which gear 73 is mounted. The slide 91 is adjustable longitudinally of the crank arm 92, to vary the effective length of the latter, by means of a screw 93 that is journaled in the said crank arm and is threaded through an ear 91ᵃ formed on the slide. The screw 93 is manually rotatable by means of a spiral gear 94 that is mounted thereon, which gear is meshed with a spiral gear 95 that is keyed to a short shaft 96 that is journaled in hub portion 92ᵃ of crank arm 92, at right angles to the direction of movement of slide 91. Shaft 96 has a squared, exposed end portion engageable by a socket wrench for manually rotating said shaft to move slide 91 along crank arm 92, radially of shaft section 74ᵇ.

The arrangement is such that varying the effective length of crank arm 92 varies the extent of the arc through which quadrant 86 oscillates during each revolution of the cam and crank shaft. This variability of movement of the quadrant may be appreciated by comparing the positions of the quadrant as shown in Figures 19 and 20, the quadrant in each case being shown at one extremity of its range of movement. The extent of angular movement of the quadrant controls the number of revolutions of the bead core form during the building of bead cores, as presently will be explained, whereby cores of various plies are produced. To facilitate accurate adjustment of slide 91 relatively of crank arm 92, the latter is formed with an extension 92ᵇ on the opposite side of its axis from screw 93, and said extension is formed with two parallel series of apertures 97, the apertures of one series being in staggered relation to those of the other series. The apertures 97 are positioned at different distances from the axis of the crank arm, and may be provided with suitable numerical indicia, as shown in Figures 19 and 20, to indicate various numbers of bead core plies. Slide 91 has an extension 91b overlying crank arm extension 92b, and formed with a pair of apertures 98 adapted alternatively to register with the apertures 97 of each series in the crank arm extension. When one of apertures 98 is registered with an aperture 97, the number of said aperture 97 will be visible through the other aperture 98. A removable pin 99 is provided for inserting in the apertures 97, 98 that are in registry to retain the crank arm and slide in adjusted relative position at all times except when an adjustment is to be made, whereupon the pin is removed.

The gear sector 87 on quadrant 86 is meshed with a pinion 101 on the projecting rear end portion of a shaft 102 that is journaled in the front and rear walls of housing 60, above and parallel to shafts 74a, 74b and 71. Interiorly of the said housing shaft 102 has mounted thereon a large gear 103 that is meshed with a pinion 104 and that is associated with a roller ratchet or clutch, generally designated 105, shown most clearly in Figures 17 and 18. The roller ratchet 105 is keyed upon a shaft 106 that is journaled in the front and rear walls of housing 60, the arrangement being such that shaft 106 is driven by pinion 104 when the latter rotates in one direction, but is stationary when said pinion rotates in the opposite direction. In order to prevent overrun or coasting of shaft 106, upon extraordinary occasions, such as when tension on the rubberized tape from which a bead core is being wound is accidentally released, a brake band 108 is trained about the perimeter of roller ratchet 105, one end of said brake band being secured to a stud 109 projecting from the rear wall of housing 60, and the other end of the brake band being connected to a spring-boot 110 slidably mounted in a stud 111 projecting from the said housing wall, the arrangement being such as to keep the brake band taut at all times.

Figure 14:
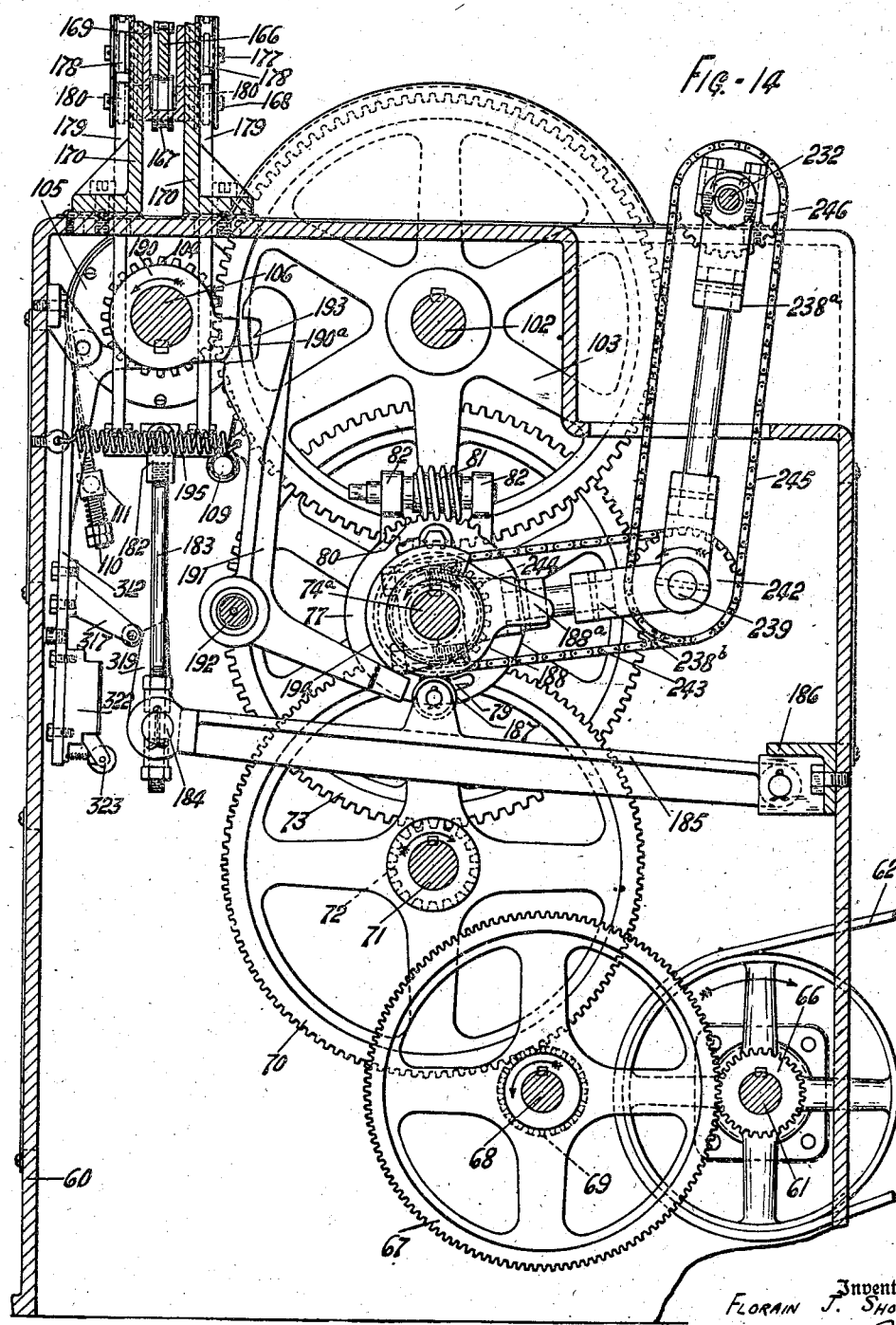
Figure 14 is a section on the line 14—14 of Figure 12.

In order that the shaft 106 will be held fixedly in determinate angular position while stationary, a collar 190 formed with a projecting dog 190a, Figures 12 and 14, is mounted upon said shaft. Said dog is engageable with a latch consisting of a member 191 shaped as a bell-crank and pivotally mounted on a stub-shaft 192 projecting from the wall of housing 60. One arm of latch member 191 is formed in its free end with a notch 193 adapted to engage dog 190a, the other arm of the latch member extending below shaft 74a and engaging a cam 194 on said shaft. A tension spring 195 is connected to the notched arm of member 191 and to a fixed point on housing 60 in such a manner as normally to urge the other arm of said member against said cam. The latter is so shaped as to hold the notched end of the latch member out of the orbit of dog 190a during intervals that the shaft 106 is being driven, and to permit said notched end to move into the orbit of said dog to engage the same as the driving of shaft 106 ceases whereby the latter is brought to rest at a determined angular position, coasting is prevented, and the shaft securely held against movement until time for it again to be driven, at which time the cam withdraws the latch from the dog.

The front end portion of shaft 106 projects from the front of housing 60, and carries thereon the form, generally designated F, upon the perimeter of which the tire bead cores are wound. From the foregoing description of the form rotating apparatus it will be understood that the form always rotates in one direction, that is, counterclockwise as viewed in Figures 1, 4, 10 and 22. Referring back to Figures 19 and 20, the form F is rotated while the crank arm 92 is moving from the positions shown, clockwise to complemental positions on the opposite side of crank shaft 74b, and is stationary while the crank is traversing the remainder of the distance back to point of starting. Thus although each revolution of the crank arm 92 at any setting effects operative cycles of the form F comprising a rotating phase and a stationary phase, which cycles are of equal length, the rotative phase is of longer duration and the stationary phase shorter for bead cores of the larger number of plies. Because of the relative positions assumed by the crank arm 92 and quadrant 86 during a complete revolution of the crank arm, it will be seen that form F both starts and stops at relatively slow speed as compared to its intermediate speed, with the result that jolts and jars due to inertia of the form are largely avoided and maintenance cost reduced. It will also be seen that shaft 106 can be caused to make different numbers of revolutions for each revolution of the cam and crank shaft according to the particular adjustment of the crank-arm-slide 91.

The form

Figure 22:
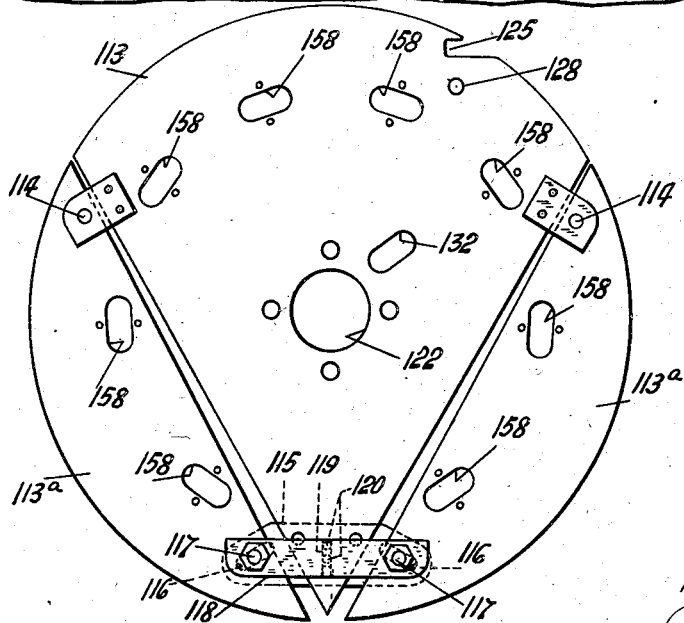
Figure 22 is an elevation of a bare bead-winding form showing how it is adjusted to produce bead cores of small differences in diameter.

As hereinbefore stated, the apparatus employs forms of various sizes for producing bead cores having major differences in diameter, each form being adjustable in circumference so the cores having but minor differences in diameter may be made on the same form. Referring now to Figure 22, the form F comprises a sectional, circular disc or plate comprising a major section 113 and a pair of identical minor, chordal sections 113a, 113a. At one of their corners the chordal sections 113a are adjacent each other, and adjacent their remote corners they are hingedly connected to major section 113 by respective hinge pins 114. A plate 115 is secured to the rear face of major form-section 113, which plate projects laterally beyond said section and underlies the adjacent corners of the respective chordal sections 113, being formed in its projecting portions with respective arcuate slots 116, 116 that are concentric with respective hinge pins 114. Formed in the adjacent corners of said chordal sections are bolt holes (not shown) which register with respective slots 116 and receive bolts 117 that extend through said slots. Removably mounted on the outer or front face of the form is a gauge plate 118 provided with suitable bolt holes (not shown) for engaging bolts 117, the medial portion of said gauge plate having its rear face formed with a transverse slot 119 engageable with studs 120, 120 projecting from major section 113 for accurately centering the gauge plate. The gauge plate 118 determines the angular position of chordal sections 113a with relation to major section 113, and thus determines the circumference of the form. A plurality of the gauge plates are provided, with bolt holes spaced various distances apart, whereby the form may be easily and accurately adjusted to different circumferences for making bead cores of minor differences in diameter. Numerical indicia may be stamped on the gauge plates to render proper selection easy.

The major section 113 of the form F is formed with an axial aperture 122 and suitable bolt holes surrounding the same by means of which the form is received upon a hub 123 and secured thereto by bolts 124, 124. The hub 123 is keyed to the outer end portion of shaft 106, and various forms of different major diameters are easily and quickly mounted thereon and removed therefrom.

Figure 13:
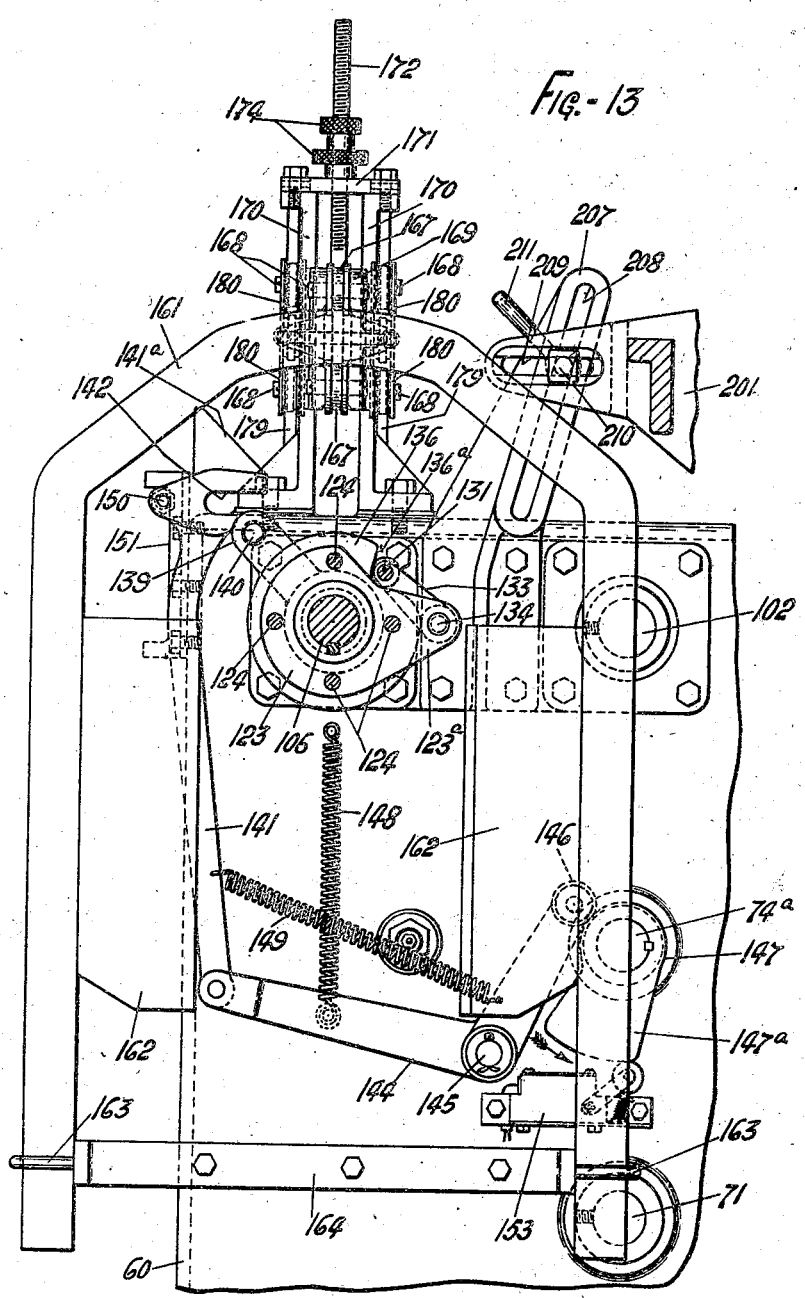
Figure 13 is a section on the line 13—13 of Figure 12.

Major form-section 113 has formed in its perimeter a short, non-radial slot 125 which, in the idle or stationary position of the form, is disposed adjacent the top thereof, to the right of center as shown in the drawings, said slot being positioned to receive the leading end of a continuous, rubberized, wire tape 126 during the operation of the machine, from which tape the bead cores are produced. A clamp or gripper 127 on the front face of form F has a rearwardly projecting portion or jaw 127ª, Figure 9, that extends into slot 125 and is adapted to engage and grip the leading end of tape 126 so that the tape will be drawn onto the perimeter of the form when the latter rotates. The gripper 127 is pivotally mounted at 128 on the form, and is formed with an oppositely extending lever arm 129 that is pivotally connected to one end of a link 130, the other end of the latter being pivotally connected to a pin 131 that extends from the rear of the form through a slot 132 therein. The pin 131 is carried in the free ends of a pair of arms 133 that are pivotally mounted at 134 upon a bracket-like formation 123ª projecting radially from hub 123. The rear end portion of pin 131 projects beyond arms 133 and is provided thereat with a cam roller 135 that rides upon the perimeter of a cam structure 136 that is journaled upon shaft 106 just behind hub 123. As is best shown in Figures 10, 11 and 13, the cam 136 is formed with a single depression 136ª that is abrupt on one side and sloped on its other side, and during the winding of a bead core the cam roller 135 is positioned in said depression, being urged thereinto by a tension spring 137 that is connected to link 130 and to a fixed point on form F, in which position of the parts the gripper jaw 127ª grips tape 126. Cam 136 rotates with form F during the winding of a bead core.

During the intervals that the form is stationary, the cam 136 is moved relatively of the form, counter-clockwise as viewed in Figures 10, 11 and 13, to operate the gripper 127 to release the end of the bead tape, such movement of the cam structure being possible by reason of its being journaled on shaft 106. For so moving cam 136, the cam structure is formed with a radial arm 139 having its free end provided with a rearwardly extending stud 140, that projects into the path of the hooked upper end of a vertically movable gripper-opening member 141. The hooked end of member 141 comprises a horizontal slot 142 into which the stud 140 moves when engaged by the overhanging lip of said slot, in the downward movement of member 141. The extent of said downward movement of member 141 is sufficient to turn cam structure 136 angularly so that the elevated portion of the cam moves under cam roller 135 as shown in Figure 11, and thus moves link 130 longitudinally, against the tension of spring 137, to open jaw 123ª and release the leading end of tape 126.

At its lower end member 141 is pivotally connected to one arm of a bell-crank 144 that is pivotally mounted at 145 upon the front wall of housing 60, the other arm of said bell-crank having its free end provided with a cam roller 146 that rides upon the perimeter of a cam 147 that is mounted upon the front end of cam and crank shaft section 74ª. A tension spring 148 is connected to one arm of the bell-crank and to a fixed point on the housing 60 for urging cam roller 146 against cam 147. A tension spring 149 is connected to the other bell-crank arm and to member 141 in such a manner as to urge the hooked end of member 141 toward the right as viewed in the drawings. Mounted in the upper end of member 141 is a rearwardly projecting, headed stud 150 that engages a vertical guide plate 151 on the side of housing 60, the arrangement being such as to retain the slotted end of member 141 in proper position laterally while permitting it to move up and down. The major portion of cam 147 consists of a low portion upon which the cam roller 146 rides during the intervals that the form F is rotating, as shown in Figures 1, 10, and 13. Said cam includes an elevated portion 147ª of considerable extent that engages cam roller 146 during the intervals that the form is stationary, to lower hook member 141 and thus to turn cam 136 angularly as shown in Figure 11, to move gripper 127 from the position shown in full lines in Figure 10 to the position shown in broken lines therein to release tape 126. The gripper 127 is so constructed and arranged in slot 125 that when it releases the end of tape 126 the latter is unobstructed and thus is free to spring outwardly against the inner perimeter of the bead core on the form F. During the interval that the gripper is raised, the finished bead core is ejected from the form, and the leading end of tape 126 again inserted in slot 125, the cam roller 146 passing off of cam elevation 147ª and the gripper again engaging the tape before rotation of the form is resumed.

An electric switch 153 is mounted upon the front of housing 60 with its operating lever projecting into the orbit of cam elevation 147ª so as to be periodically operated thereby during intervals that the form is rotating. Switch 153 is in an electrical circuit (not shown) that operates a wrapping apparatus when a bead core is properly positioned in the latter, said wrapping apparatus constituting the subject matter of my copending application for Letters Patent hereinbefore mentioned.

The work-ejecting means

Completely wound bead cores, such as that shown at 155, Figure 3, are ejected from the form F during the intervals that the form is stationary, after the tape 126 is severed from the wound core and after gripper 127 has been released as described. For ejecting the bead cores 155, a circumferential series of ejector fingers 156, 156 are mounted at spaced-apart points upon the rear side of form F, said fingers being pivotally mounted upon respective hinge blocks 157 that are mounted upon the front face of the form and extend rearwardly through respective apertures 158 therein. The ejector fingers 156 are of generally C-shape, and are so pivoted on the form that when they are moved forwardly a portion of each finger will move across the periphery of the form, in an axial direction, and push the bead core 155 therefrom. A tension spring 159 is connected to each finger 156 and respective hinge block 157 in such a manner as normally to urge the finger to retracted inoperative position as shown in full lines in Figures 3 and 12.

For moving the ejector fingers forwardly, as shown in broken lines in Figure 3, to eject a bead core from the form F, there is provided an ejector frame or yoke 161, best shown in Figure 13, that has the general shape of an inverted U, said frame being mounted upon the front of housing 60 behind form F, its arcuate medial portion being disposed behind fingers 156 on the upper part of said form. Laterally extending plates 162, 162 are secured to the inner margins of the respective leg portions of the ejector frame, behind fingers 156 on the lower portion of the form. The ejector frame is arranged for pivotal movement toward and from the form F, the respective leg portions of the frame being loosely retained in U-shaped loops 163 secured to the respective ends of a bracket 164 on the front wall of housing 60, said loops constituting the axis of pivotal movement of said ejector frame.

For supporting and pivotally moving the ejector frame 161, the latter is pivotally connected at its uppermost, arcuate portion, to the forward end of a push-bar 166. The latter is mounted for longitudinal movement in four grooved sheaves or guide rollers 167, 167 arranged in pairs adjacent the front and rear ends of the push-bar, in engagement with the upper and lower margins thereof. Guide rollers 167 are journaled on suitable spindles 168 that are carried by a frame 169 that is vertically slidable between a pair of lateral brackets 170, 170 mounted on top of housing 60. A cap-plate 171 extends across the tops of brackets 170, and extending through said cap plate is a threaded bolt 172 that is connected at its lower end by pin 173, Figure 12, to slidable frame 169. Lock nuts 174 are threaded onto bolt 172 above cap plate 171, the arrangement being such that by turning said nuts the bolt 172 and frame 169 may be raised and lowered, upon occasion, such as when a form F of different circumference is substituted for the form previously in use. A tension spring 175, Figure 12, connected to push-bar 166 and to a fixed point on frame 169 normally urges said push-bar rearwardly to a determinate inoperative position.

For urging the push-bar 166 forwardly, against the tension of spring 175, in timed relation to the operative cycles of the mechanism previously described, a spindle 177 is mounted transversely in the rear end of push-bar 166, the laterally projecting end portions of said spindle having grooved sheaves 178, 178, Figures 12 and 14, journaled thereon, said sheaves 178 being disposed in respective bights in chains 179, 179 that have their upper ends connected to cap plate 171, and are trained about grooved sheaves 180, 180 journaled on the end portions of the rear spindles 168, on the outer sides of frame 169. At their lower ends the chains 179 are connected to a yoke 182 that is connected to the upper end of a link 183, the lower end of the latter having pivotal connection at 184 with the free end of a lever 185 that extends transversely of the housing 60, between shafts 71 and 74ª, and is pivotally mounted at its other end on a bracket 186 secured to the housing wall. Near its middle the lever 185 carries a cam-roller 187 in suitable ears formed on its upper margin, said cam-roller riding on the perimeter of a cam 188, Figure 14, mounted on cam and crank shaft section 74ª. Cam 188 comprises a single elevation 188ª adapted to depress lever 185 and thus to cause chains 179 to project push-bar 166 forwardly, against the tension of spring 175, whereby frame 161 actuates ejector fingers 156. Spring 175 also serves to keep cam roller 187 in engagement with cam 188. The latter is so positioned on shaft section 74ª with relation to the angular position of cam 147 thereon that the ejector fingers operate to eject the wound core 155 after gripper 127 has released the tape-end thereof.

Since the ejecting movement of frame 161 is angular about members 163 as an axis, it follows that the upper or free end of the frame will have greater lineal movement than lower portions thereof, with the result that the ejector fingers 156 at the top of the form F are moved faster and farther than the fingers at lower positions, and move across the periphery of the form prior to the lower fingers, whereby the core 155 is first ejected from the top of the form. This causes the ejected core to fall while in a determinate angular position, which facilitates its reception in other apparatus for performing other operations thereon. Furthermore, the fingers 156 are somewhat arcuately shaped so that the frame 161 engages each finger progressively from its outermost end, inwardly toward its pivoted end, with the result that the initial operative movement of each finger, wherein it engages the bead core and moves it off the form, is relatively slow, and its subsequent movement, wherein it pushes the bead core farther away from the form, is relatively rapid. This feature of the invention permits ejection of the work without distorting or injuring it.

Since the form-shaft-latching mechanism, the gripper operating mechanism, and the work-ejecting mechanism operate during the interval that the form is stationary, and since the stationary phase of form operation varies for work or different numbers of plies, it is important that means be provided for synchronizing the aforesaid operations with the phases of operation of forms making different numbers of revolutions. This means is the coupling, Figures 12, 15 and 16, hereinbefore described by means of which the respective cam and crank shaft sections 74ª, 74ᵇ are angularly adjusted relatively of each other.

*The tape-feeding means*

Figure 4:
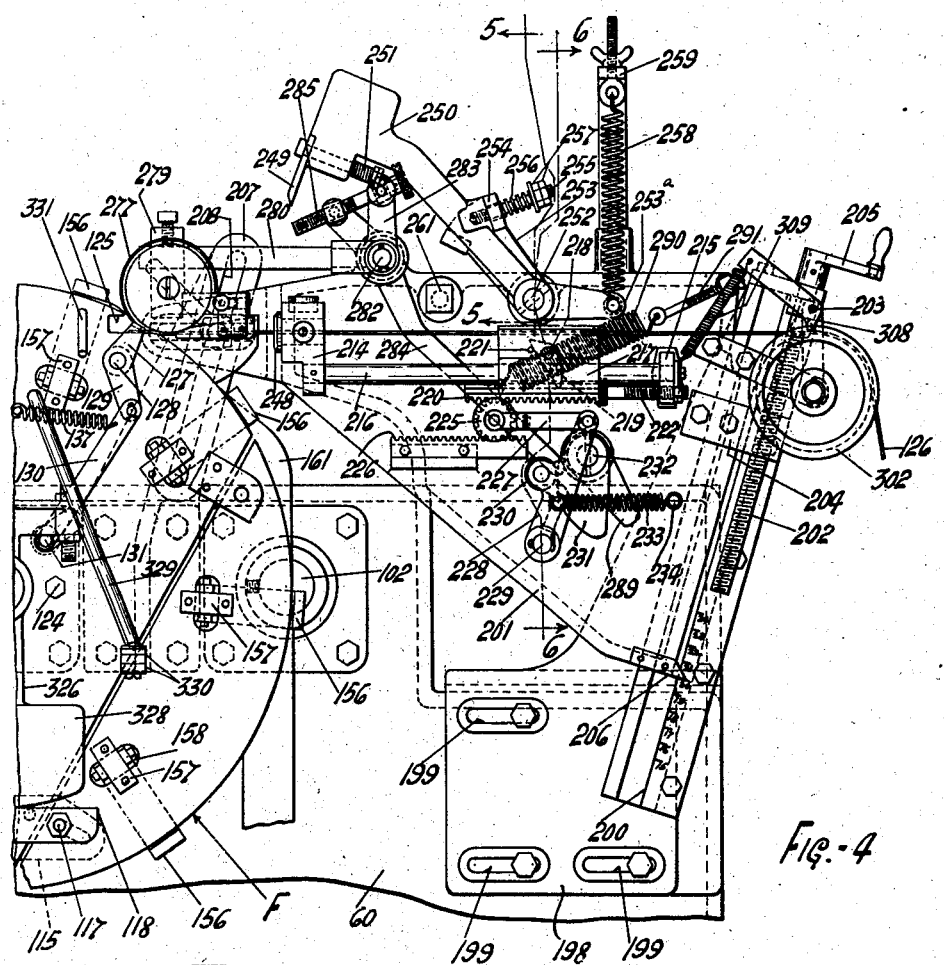
Figure 4 is a front elevational detail, on a larger scale, of the mechanism at the right-hand end of Figure 1.

Mounted upon the front of the housing 60, at the right-hand end thereof, as shown in Figures 1 and 4, is a bracket 198 that is secured to the housing by means of bolts that extend through horizontal slots 199, 199 in said bracket, whereby the latter has limited adjustability toward and away from the form F. The bracket 198 has a portion that extends obliquely upwardly, away from form F, and comprises a dovetail slideway 200 in which is slidably mounted one margin of a generally triangular frame 201 that extends toward form F. A screw 202 is journaled in a plate 203 at the top of bracket 198 and is threaded through a nut 204 that is secured to frame 201, the end of screw 202 above plate 203 being provided with a hand crank 205 by which said screw may be rotated to raise or lower frame 201 and concurrently to move it toward or away from form F. This feature of the invention makes it possible to position the frame 201 in proper relation to forms F of different diameters. Numerical indicia may be stamped on the slideway 200 as shown, and the frame 201 may have an indicator 206 associated with said indicia to indicate the proper setting of the frame for forms F of various diameters. For rigidly supporting the corner of frame 201 nearest form F, a bracket 207 is mounted on housing 60 behind said form, said bracket extending upwardly from the housing behind frame 201, and being formed with an oblique slot 208 that is parallel to slideway 200 of bracket 198. The adjacent corner of frame 201 is formed with a horizontal slot 209, and said frame and bracket 207 are secured to each other by a bolt 210 that extends through slots 208, 209, the nut on said bolt being provided with a handle 211 by which the nut is manually turned for quick adjustment of the frame.

Formed on the frame 201 and extending forwardly therefrom is a front bracket 214, and a rear bracket 215 is attached to the frame, said brackets carrying a pair of parallel guide rods 216, 216 disposed in the same horizontal plane. Slidably mounted on guide rods 216 is a slide generally designated 217, which slide comprises spaced apart lateral sections 217ª, 217ª mounted on the respective guide rods 216, and connected by a cap plate 217ᵇ as most clearly shown in Figure 6. A pin 218 has its ends mounted in respective slide sections 217ª and transverses the space between them, and a feed pawl 219 is pivotally mounted in its medial region on said pin. A rack 220 with teeth on its bottom face is slidably mounted for longitudinal movement upon slide sections 217ª, in the lower part of the space therebetween, and the pawl 219 has its lower end engaged in a suitable notch formed in the upper face of said slide, the arrangement being such that the pawl is rockable by movement of the rack relatively of the slide. The wire tape 126 extends through slide 217 in the space above pawl 219 and below cap plate 217ᵇ. When the rack 220 initially is advanced to the left as viewed in Figures 1 and 4, pawl 219 is so rocked that its upper end engages tape 126 and binds it against cap plate 217ᵇ, with the result that further relative movement of rack and slide 217 is prevented, and the latter then moves with said rack, whereby the tape is advanced.

In the retractive movement of rack 220, the latter moves relatively of slide 217 and rocks pawl 219 on its pivot so that it releases its engagement with the tape. A pin 221, Figure 4, is mounted in slide 217 in such position as to limit movement of the pawl 219 away from said tape, and it also prevents further relative movement of slide and rack during retraction of the latter so that the slide and rack are retracted as a unit, both moving relatively of the tape 126 after the tape is released by the pawl. In retracted position, rack 220 and slide 217 abut an adjustable positive stop consisting of a headed bolt 222 threaded into rear bracket 215. The position of stop 222 determines the distance the tape 126 is fed forward each time the slide 217 is advanced, and hence determines the distance that the leading end of said tape will extend into slot 125 of form F.

For advancing the rack 220 as described, a gear pinion 225 is provided, which pinion meshes with rack 220 and with a stationary rack 226 secured to frame 201. The pinion 225 is journaled in one end of a push-rod 227, the other end of the latter being pivotally connected to the free end of a lever arm 228 that is pivotally mounted on a spindle 229 projecting forwardly from frame 201. The lever arm 228 carries a cam roller 230 that is positioned at one side of said lever arm and in the orbit of a cam 231 that is mounted upon a cam shaft 232. The lever arm 228 is yieldingly held in the normal position shown in Figures 1 and 4 by means of a pair of tension springs 233, 233 that are connected to the lever arm and to a stud 234 projecting from frame 201. The normal position of the lever arm 228 as shown is determined by the position of adjustable stop 222. The arrangement is such that the slide 217 executes one cycle of operation, that is, moves to the left to advance the work and then returns to point of starting, for each revolution of cam shaft 232, and the feature of operating the slide 217 by means of two racks and a pinion multiplies the movement imparted to lever arm 228 by the cam 231 with the result that it is possible to accomplish the end desired with a relatively small cam.

Figure 6:
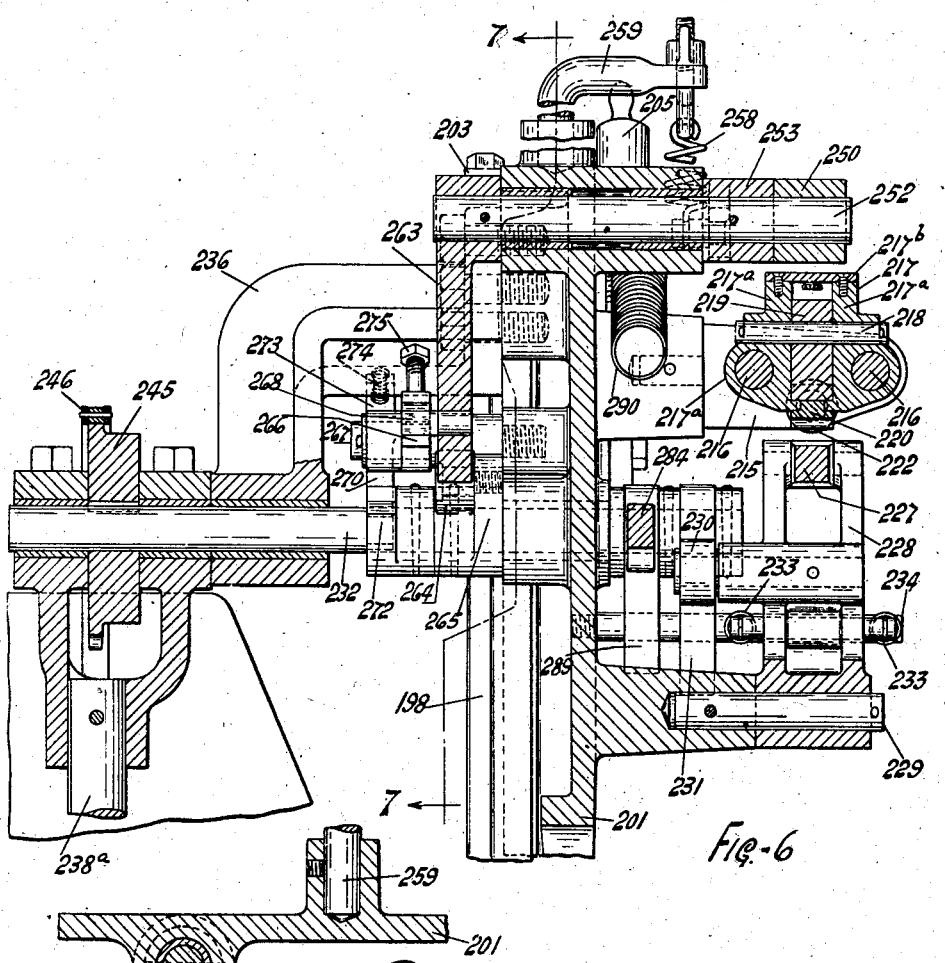
Figure 6 is a section, on a larger scale, on the line 6—6 of Figure 4.
Figure 7:
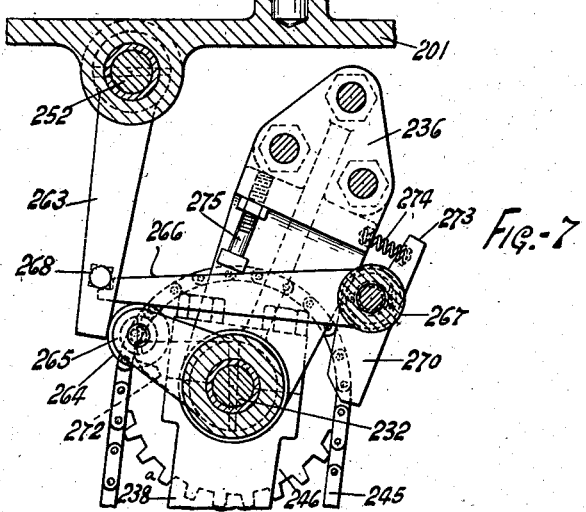
Figure 7 is a section on the line 7—7 of Figure 6.

As is most clearly shown in Figures 6 and 7, the cam shaft 232 is journaled in suitable bearings in frame 201 and in an outboard bearing bracket 236 mounted on the rear side thereof. The cam shaft 232 is driven from the cam and crank shaft 74ª and at the same rotative speed as the latter. To this end the said shafts are connected by an elbow drive mechanism comprising an upper section 238ª swiveled on the projecting rear end portion of cam shaft 232, and a lower section 238ᵇ swiveled on cam and crank shaft 74ª, the said elbow drive sections being disposed at an angle to each other and pivotally connected to each other at their adjacent ends by means of a hinge pin 239 as is most clearly shown in Figure 14. Journaled on hinge 239 is a dual sprocket comprising sprockets 241, 242, Figure 12, of which sprocket 241 is connected by sprocket chain 243 with a sprocket 244 on cam and crank shaft 74ᵇ, and sprocket 242 is connected by sprocket chain 245 with a sprocket 246 mounted on cam shaft 232. The arrangement is such that cam shaft 232 is driven in all positions of adjustment of frame 201, and the latter may be adjusted without disturbing the drive of the cam shaft. Since the cam shaft is driven at the same speed as cam and crank shaft 74ᵇ, the strip feeding means will operate in proper timed relation to the phases of operation of the form F. Moreover, relative adjustment of cam and crank shaft sections 74ª, 74ᵇ, to compensate for winding bead cores of different numbers of plies, will similarly adjust the relative angular position of crank shaft 232 so that the mechanisms operated thereby will always operate in proper timed relation to the said winding form.

*The tape-severing means*

After the tape 126 has been engaged at its leading end to the form F, and the latter has made the proper number of revolutions to wind a plurality of convolutions of the tape thereon, the form stops rotating and immediately the tape is severed. The severing of the tape is effected at a point which provides a substantial overlap of the ends of the tape in the wound bead core 155, usually about five inches, but this distance may be varied, if desired, by adjustment of stop-screw 222, or by adjusting the position of bracket 198 on housing 66 by means of the supporting bolts which extend through slots 199 in said bracket. The tape severing means includes a die 248, Figures 4, 8 and 9, that is mounted in bracket 214 on frame 201, said die being formed with an orifice or slot that is slightly larger than the tape and through which the tape passes, the die supporting the tape while the latter is severed, immediately in front of said die.

Cooperating with die 248, for the severing of the tape, is a blade 249 that is normally disposed in an elevated position, and at the proper time is caused to descend in an arcuate course and sweep across the front face of the die and thus to shear the tape extending therethrough. The downward sweep of blade 249 is arrested as soon as the tape is cut, and the blade instantly is retracted or raised sufficiently to clear the die-orifice, and subsequently is raised to its normal elevated, inoperative position. To assure proper cooperation of die 248 and blade 249, the latter is mounted for limited movement relatively of the member that carries it, and the marginal portion of the front face of the die is beveled as shown to guide the blade into contact with said die-face.

The blade 249 is secured to the end face of the weighted, hammer-like, free end of an arm, 250, the blade-attaching means including compression springs, such as the spring 251, Figures 1 and 4, which permit limited movement of the blade away from the end of said arm. At its opposite end the arm 250 is journaled on the front end portion of a shaft 252 that is journaled in a suitable bearing formed on frame 201, the shaft projecting beyond the rear face of said frame. Fixed to shaft 252, beside arm 250, is a lever arm 253 that is formed with a laterally extending lug 254 that overlies arm 250, the arm and lever arm being connected to each other by a threaded stud 255 that is secured to arm 250 and passes freely through an aperture formed in the lug 254, there being a compression spring 256 mounted upon said stud between lug 254 and lock nuts 257 threaded onto the stud. The arrangement is such that the arm 250 and lever arm 253 normally are yieldingly held together in the relative positions shown clearly in Figures 1 and 4. The lever arm 253 is formed, on the other side of its axis, (the shaft 252) with a projecting portion 253a to the free end of which is connected one end of a tension spring 258, the other end of the latter being connected to an angular overhanging post 259 rising from the top of frame 201. The spring 258 normally urges lever arm 253 and cutter arm 250 to angular movement in the direction to carry blade 249 toward die 248, shaft 252 turning with said lever arm.

Figure 5:
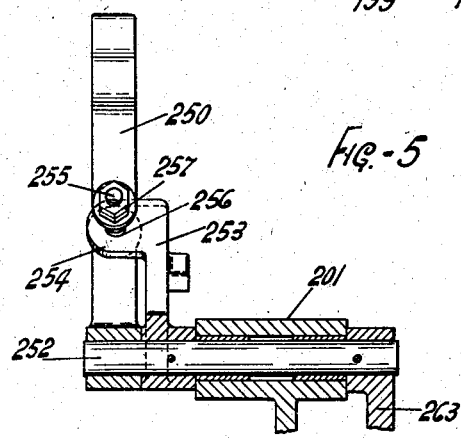
Figure 5 is a fragmentary section on the line 5—5 of Figure 4.

Movement of lever arm 253 under impetus of spring 258 is limited by a positive stop or abutment 261, see Figures 4, 8, and 9, consisting of a square metal block mounted on frame 201, and projecting forwardly therefrom into the path of the lever arm so as to be struck by the lower edge thereof, the latter being suitably reinforced by a projecting lug as is most clearly shown in Figure 5. When the lever arm 253 is at rest upon abutment 261, the blade 249 is positioned above the orifice in die 248 so as not to obstruct the same. But when the blade 249 is caused to descend under the impetus of spring 258, and the lever arm 253 stops upon engagement with said abutment, the momentum and inertia of the weighted arm 250 cause it to move relatively of said lever arm, against the pressure of spring 256, and thereby to sweep the blade 249 across the front of die 248 so as to effect a shearing action on the tape 126 that extends through the latter. As soon as this movement of arm 250 ceases, upon complete compression of spring 256, the expansive force of the latter raises the arm 250 sufficiently to lift the blade 249 above the orifice in die 248 as hereinbefore mentioned, which position is maintained until the lever arm 253 subsequently is raised to the position shown in the drawings, as presently will be described. This "whipping" action of the arm 250 has been found very effective for the purpose set forth, and the mechanism is substantially the same as that shown in my Patent No. 1,957,981, issued May 8, 1934.

The arm 250 and lever arm 253 are moved to and retained in the elevated, inoperative positions shown, and released therefrom at determinate intervals in timed relation to the phases of operation of form F, by means of latch and release mechanism shown most clearly in Figures 6 and 7. Said mechanism comprises a lever 263 mounted upon the rear end portion of shaft 252 and extends downwardly therefrom into the orbit of a cam-roller 264 mounted upon the outer end of a cam-arm 265 that is fixed upon cam-shaft 232. The cam-roller 264 is adapted to engage lever 263 and move it angularly to the position shown in Figure 7 with the result that shaft 252 is turned and lever arm 253 and cutter arm 250 are thereby lifted to the inoperative position shown in the drawings. For releasably retaining lever 263 in the position shown there is provided a latch 266 that is pivotally mounted upon a spindle 267 projecting rearwardly from frame 201, the free end of the latch being notched as shown for the purpose of engagement with a square stud 268 mounted in lever 263 and projecting laterally therefrom. The hub of latch 266 is formed with an integral trip-lever 270 that projects downwardly into the orbit of a trip-arm or cam 272 mounted upon cam shaft 232 and rotating with it. The hub of the latch 266 also is provided with an integral, upwardly extending ear 273, and a compression spring 274 is mounted between said ear and the outboard bearing 236, the arrangement being such that the free end of trip lever 270 is yieldingly urged toward trip arm 272 and the free end of latch 266 is urged upwardly. A positive stop consisting of a cap screw 275 is threaded into outboard bearing for limiting upward movement of latch 266 under pressure of spring 274.

As will be seen with reference to Figure 7, the cam arm 265 and the trip arm 272 are disposed substantially beside each other, but that lever 263 and trip lever 270 are disposed on opposite sides of cam shaft 232. Since the latter rotates in determinate synchronism with the shaft 106 of form F, the trip arm 272 may be positioned angularly on cam shaft 232 to engage and move trip lever 270 and thereby to release latch 266 at the proper time with relation to the phases of operation of form F, that is, immediately the form stops rotating. Releasing latch 266 permits spring 258 to operate cutter arm 250 as previously described. Subsequently cam roller 264 engages lever 263 and moves it back to the position shown whereby the cutter arm is lifted to its normal inoperative position, and latch 274 permitted to move, under pressure of spring 274, back into latching engagement with said lever 263. The interval between the aforesaid operations is not critical since the cutter blade is retracted from in front of die 248 by spring 256 immediately the tape 126 is severed.

*The work-pressing means*

The work 155 is progressively pressed and compacted as the various convolutions thereof are applied to the form F, and the pressure applied may be varied to suit different conditions. The work-pressing means operates in determinate timed relation to the phases of operation of the form, so as to lift from the latter as it ceases rotating and thus to permit the finished work to be ejected from the form and the leading end of the tape 126 to be fed forward to the form. The presser means descends after the tape end has been fed to the form but before the gripper 127 has engaged the tape, said presser means including a guide structure which engages the tape end and accurately positions it laterally so that it is properly engaged by said gripper.

The work-pressing means comprises a flanged presser roller 277 that is engageable with the periphery of form F, and is journaled upon a spindle 278 projecting from a block 279 that is slidably mounted upon an arm 280 so as to be adjustable longitudinally thereof. The arm 280 is carried by a hub structure 281, that is journaled upon a spindle 282 projecting forwardly from frame 201, said hub being formed with a short radial arm 283 disposed at right angles to arm 280. Also mounted upon spindle 282, beside hub 281, is a lever 284 of the first class, one end portion of which is disposed at an acute angle to hub arm 283, and is connected thereto by means of a manually operable adjusting screw 285 that extends through a split block 286 swiveled on the free end of hub arm 283 and is threaded through a block 287 that is swiveled on the adjacent end of lever 284. The arrangement is such that the presser-roller arm 280 may be adjusted angularly of lever 284.

The other end of lever 284 extends into the orbit of a cam 289 mounted upon cam-shaft 232, beside cam 231 thereon. The cam 289, operating through said lever, raises and lowers presser roller 277 at the proper time with relation to the movement of form F, as previously described. A tension spring 290 is connected to this end of lever 284 and to a threaded eye 291 adjustably mounted in a suitable projection on frame 201, the arrangement being such as to cause the presser roller 277 to bear against the form F with yielding pressure, which pressure may be varied as desired.

The strip-guiding structure associated with the work-pressing means is best shown in Figures 8 and 9. It comprises a block 294 that is secured to the bottom of block 279 and projects therefrom toward die 248. Secured to the front face of block 294 is one element 295 of the guide structure, the front face of which is suitably shaped as shown in broken lines in Figure 9. Slidably mounted in block 294 is a spindle 296 that carries a block 297 on its front end, and block 297 carries a second guiding element 298 that has its inner face shaped as indicated in broken lines in Figure 9. A compression spring 299 on spindle 296 normally urges the latter rearwardly, and an adjusting screw 300 threaded through block 297 and bearing against block 294 is provided for properly positioning guide-element 298. The guide structure described is adapted to engage the lateral margins of tape 126, as the presser arm 280 descends, to position the leading end of the tape accurately with relation to form F.

The rubberized tape 126 comes to the winding unit from any convenient source of supply (not shown). At the work-receiving end of the apparatus are two flanged guide-sheaves or pulleys 302, 303 respectively, Figure 1, about which the tape passes, the sheave 303 being journaled on the free end of a pivotally mounted arm 304 that is angularly adjustable by means of a supporting arm or brace 305 having adjustable connection with housing 60 by means of slot 306 and bolt 307. By adjustment of the position of sheave 303 with relation to sheave 302 the tension on the tape 126, as it is drawn onto form F, may be varied. Cooperating with sheave 302 is a pivotally mounted pawl 308 that is urged toward the sheave by means of a tension spring 309 connected to a fixed point on bracket 215, as is most clearly shown in Figure 4. The pawl 308 is so arranged as to permit the tape 126 to be drawn to the left as shown in the drawings, by the form F or feed slide 217, but to prevent recession of the tape by movement in the opposite direction.

*Means for stopping machine when operative elements are not in synchronism*

The winding unit will operate continuously and automatically when the various operations are properly synchronized as described. It is possible, however, for the operative elements of the machine to get out of synchronism, wherefore means is provided for stopping the operation of the machine, said stoppage occurring after the form has stopped rotating, but before the work is ejected therefrom. The "out of time" condition of the machine may be the result of one of a number of causes. For example, it may be due to inaccurate setting of the machine when changing it to wrap bead cores of a different number of plies; it may be due to a heavy jerk or overload caused by a heavy lump of rubber on the tape 126 catching in the slide 217 or die 248, which would prevent the form F being stopped on dead center; or it might be the result of stopping and starting the machine two or more times during the winding of a single bead core which might cause the form to coast past dead center at the finish of that winding operation.

The means for stopping the machine when "out of time" is best shown in Figures 14 and 23 to 25, inclusive. It comprises a vertical swinging arm 312 that is pivotally mounted at its upper end in a bracket 313 that is mounted on the wall of housing 60, interiorly thereof, beside form-driving shaft 106. The upper end portion of arm 312 is formed with a laterally projecting portion 312ª having a hardened wear plate 314 on its top face, said wear plate extending beneath shaft 106. A short plate 315 of appreciable thickness is mounted on shaft 106 in position to engage wear plate 314 of arm 312 upon occasion, as presently will be described. The leading edge of plate 315 is beveled as shown. The plate 315 is so positioned on the periphery of shaft 106 as always to be on the bottom or lowest point of said shaft when the latter is stationary, between bead-winding operations, when the apparatus is properly synchronized as is shown in Figure 23.

Mounted upon the arm 312 intermediate the ends thereof is an outstanding bracket 317 having a cam roller 318 journaled in its outer end, said cam roller normally resting against a cam structure 319 formed on the free end of lever 185 of the work-ejecting mechanism. A compression spring 320 positioned between the free end of arm 312 and the wall of housing 60 normally urges the free end of said arm toward the end of lever 185. The arrangement is such that during the time shaft 106 is rotating, cam 319 by reason of its engagement with roller 318, holds wear plate 314 in slightly spaced relation to plate 315 on shaft 106. When the shaft 106 is stationary and lever 185 is depressed to the broken line position shown in Figure 23, to eject the work, plate 315, by its engagement with wear plate 314, prevents any substantial swinging movement of arm 312 under pressure of spring 320.

Mounted on arm 312, below bracket 317, is a normally closed switch 322 having an operating lever 323 projecting therefrom toward cam structure 319, but extending somewhat short of the path of said cam in the normal operation of the machine so that lever 185 may be depressed as described without engaging said switch lever. When, however, the machine is "out of time", the shaft 106 will stop rotating at such angular position that plate 315 is disposed elsewhere than at the lowest point on said shaft, as is most clearly shown in Figure 24. Then when lever 185 starts to descend to eject the finished work, and cam 319 moves away from cam roller 318, spring 320 will swing the lower end of arm 312 angularly a substantial distance, which movement is limited by engagement of wear plate 314 with shaft 106. When arm 312 is so swung, operating arm 323 of switch 322 is carried into the path of cam structure 319 whereby engagement of said members depresses said operating arm 323 to open switch 322. Switch 322 is in the electrical circuit that furnishes power to the driving motor 64, and opening of the switch immediately stops the motor and all moving parts of the machine.

When the machine stops as described because of "out of time" position, it requires to be manually restored to synchronism in the following manner. The operator turns the form F counter-clockwise until the dog 190ᵃ engages in notch 193 of latch member 191, the form being rotatable at this time because said dog and latch are not engaged when the machine stops due to non-synchronized condition. The operator also resets the cam plate 136 and its operating hook member 141 in their proper relative positions, since they are out of position when the machine is out of time. Thus the member 141 might be in a depressed position and the stud 140 might be positioned above it when the machine stopped. Under these circumstances the upper end of member 141 might bump stud 140 in rising and to anticipate this contingency the upper end of member 141 is formed with a sloping surface 141ᵃ, Figure 13, which enables member 141 to slide past stud 140 by tilting outwardly against the tension of spring 149.

The work-transfer mechanism

The mechanism for transferring the wound bead cores 155 to adjacent apparatus, after they have been ejected from the form F, is mounted upon a threaded spindle 325 projecting axially from the front end of form-shaft 106. Said mechanism comprises a general T-shaped bracket 326 that is pendulously mounted upon spindle 325 by means of bearings 327, the vertical leg of the bracket structure having its lower end provided with a counter-weight 328 whereby the bracket is maintained in determinate position at all times notwithstanding rotation of the shaft 106. The cross-arm portion of the bracket 326, which is always in horizontal position, carries a pair of guide-bars 329, 329 which are mounted for vertical adjustment in the respective end portions thereof. Said guide-bars are obliquely disposed with their upper ends disposed as closely adjacent form F as the mechanism on the front of the latter will permit, their lower end being so positioned that a bead core 155 in sliding down the said guide-bars will drop from the lower ends thereof onto a suitable supporting structure on said adjacent apparatus. The lower ends of respective guide-bars 329 are provided with rollers 330 journaled on vertical axes, which rollers assist in properly guiding the work into the said adjacent apparatus. The form F may be provided with a pair of outwardly projecting, angular fingers or pins 331 which are disposed at the top of the form and downwardly inclined when the form is stationary, for guiding a bead core 155 onto guide-bars 329 as said bead core is ejected from the form.

Operation of the winding unit

The operation of the winding unit normally is continuous, the motor 64 being continuously running. The drawings show the condition of the various elements after the leading end of the tape 126 has been fed to the form F and engaged by the gripper 127 thereof, immediately before the form starts rotating. Starting with the various parts in the positions shown, an operative cycle of the unit is as follows. First the form F starts rotating, counter-clockwise as shown in the drawings, to draw the tape 126 onto its periphery in a plurality of superposed convolutions, the number of which depends upon the setting of slide 91 with relation to crank arm 92. The form starts and stops rotating at relatively slow speed as compared to its normal winding speed so as to avoid jars and jolts. During the winding operation, presser roller 277 bears upon the work to assure compacting of the convolutions or plies thereof. After the form has made the requisite number of revolutions it comes to a stop in a determinate angular position controlled by engagement of dog 190ᵃ in notch 193 of latching arm 191.

As soon as the form stops rotating, member 141 is pulled downwardly so as to engage stud 140 of cam structure 136, and thus to move the latter angularly, relatively of form F, with the result that gripper 127 is lifted off the leading end of tape 126 to release said tape. Next, cam 289 comes into operation to raise presser roller 277 and the guide structure associated therewith to an elevated position, and almost concurrently trip-arm 272 engages trip-lever 270 and releases latch 266 so that spring 258 swings arm 250 and its blade 249 downwardly whereby said blade severs tape 126 immediately in front of die 248. Spring 256 immediately retracts arm 250 sufficiently for blade 249 to clear the orifice in die 248 so that subsequent forward feeding of tape 126 is not prevented. As soon as the tape is severed as described, frame or yoke 161 is actuated and swung forwardly about pivots or loops 163 so as to engage ejector fingers 156 and to move them across the periphery of form F to eject the wound bead core 155 therefrom. The fingers 156 at the top of the form are moved faster than those lower down so that the work assumes a tilted position and falls forwardly from the form onto guide-finger 331, and then slides down said fingers onto guide-bars 329 which deliver the work, at their lower ends, to suitable apparatus adjacent thereto for performing additional operations upon the work.

As soon as the work is ejected from the form, cam 231 comes into operation to move slide 217 to the left as viewed in the drawings, and thus to engage tape 126 and feed the forward end thereof into slot 125 in form F. Cam 289 then permits presser roller 277 to drop to its normal operative position upon the periphery of the form, the guide structure associated with said presser roller concurrently accurately positioning the leading end of the tape within said form-slot 125. By this time cam 231 has moved far enough to permit spring 233 to retract slide 217 to its inoperative position, and at about this time cam-roller 264 engages lever 263 and moves it to the position shown in Figure 7 and thereby to lift cutter arm 250 to its normal inoperative position, in which position it is retained by engagement of latch 266 with lever 263. By this time cam 147 has rotated sufficiently to permit spring 148 to lift and restore member 141 to normal position and thus to operate gripper 127 to cause it to engage the leading end of tape 126 in slot 128.

This completes one cycle of operation of the apparatus, which cycles occur successively and continuously so long as motor 64 is running. The unit may be made to wind bead cores of different diameters by the use of forms F of different sizes, and work of various numbers of plies may be produced by adjusting slide 91 relatively of crank-arm 92 and by relative adjustment of shaft sections 74ª, 74ᵇ as hereinbefore described. The unit automatically stops operating when rotation of the form is not in synchronism with the other operative elements of the unit. The apparatus is capable of large production, and it achieves the other advantages set out in the foregoing statement of objects.

Modification may be resorted to without departing from the spirit of the invention or the scope of the appended claims, which are not limited wholly to the specific construction shown and described.

What is claimed is:

1. In apparatus for winding tire beads, the combination of a rotatable shaft, an annular form thereon, means for building an endless bead upon the perimeter of said form, means for ejecting the bead from the form, and means for receiving the bead as it is ejected from said form, said means being an asymmetrical structure pendulously supported from the end of the form-shaft so as always to be disposed in the same position thereon.

2. Apparatus for winding tire beads, said apparatus comprising a disc-like form upon the perimeter of which an endless tire bead may be built, said form comprising a major section and a chordal section hinged thereto at one of its ends, and means for connecting the other end of the chordal section to the main section at different distances therefrom to vary the circumference of the form, said means comprising a gauge plate, the effective length of which bears a definite relation to the circumference of the form.

3. Apparatus for winding tire beads, said apparatus comprising a disc-like form upon the perimeter of which an endless bead core may be built, said form comprising a major section and a pair of chordal sections hinged thereto, the free ends of the chordal sections being disposed adjacent each other, a removable gauge plate for securing the adjacent ends of said chordal sections to each other, and means for preventing relative movement between the gauge plate and the major section.

4. In apparatus for winding tire beads, the combination of a rotatable form upon which a bead is built, said form having an operative cycle comprising a rotative phase and a stationary phase, a constantly rotating shaft, and a mechanical driving connection between said shaft and said form such as to cause the latter to execute one cycle of operation to each revolution of the shaft.

5. In apparatus for winding tire beads, the combination of a rotatable shaft, a form thereon upon which a bead is built, said shaft having an operative cycle comprising a rotative phase and a stationary phase, a constantly rotating drive shaft, and means comprising a crank and quadrant for transmitting motion from said drive shaft to the form shaft whereby the latter executes an operative cycle during each revolution of the drive shaft.

6. In apparatus for winding tire beads, the combination of a rotatable shaft, a form thereon, said shaft having an operative cycle comprising a rotative phase and a stationary phase, a constantly rotating drive shaft, a mechanical driving connection between the drive shaft and the form shaft such as to cause the latter to execute an operative cycle during each revolution of the drive shaft, and means for adjusting the last-mentioned means for varying the number of revolutions of the form shaft during an operative cycle.

7. In apparatus for winding tire beads, the combination of a rotatable shaft, a form thereon upon which a bead is built, said shaft having an operative cycle comprising a rotative phase and a stationary phase, a constantly rotating drive shaft, means comprising a crank and quadrant for transmitting motion from said drive shaft to the form shaft whereby the latter executes an operative cycle during each revolution of the drive shaft, and means for varying the length of the crank so as to vary the number of revolutions made by the form shaft during an operative cycle.

8. A combination as defined in claim 7 including a ratchet in the form-driving means whereby the form-shaft rotates as the quadrant moves in one direction and is stationary while the quadrant moves in the opposite direction.

9. In apparatus for winding tire beads, the combination of a rotatable shaft having an operative cycle comprising a rotative phase and a stationary phase, a form on said shaft upon which a tire bead is built, a constantly rotating drive shaft, means so connecting the drive shaft to the form shaft as to cause the latter to execute an operative cycle during each revolution of the drive shaft, and means on the drive shaft for stopping rotation of the form shaft, and for locking it against rotation during its stationary phase.

10. In apparatus for winding tire beads, the combination of a rotatable shaft having an operative cycle comprising a rotative phase and a stationary phase, a form on said shaft on which a bead is built, a constantly rotating drive shaft, means so connecting the latter to the form shaft as to cause the form shaft to execute an operative cycle during each revolution of the drive shaft, a dog on the form shaft, a pivotally mounted latch engageable with said dog, and means on the drive shaft for causing said latch to engage said dog during a determinate interval of each operative cycle of the form shaft.

11. In apparatus for winding tire beads, the combination of a rotatable shaft having an operative cycle comprising a rotative phase and a stationary phase, a form thereon upon which a tire bead is built, a constantly rotating drive shaft that is transversely divided into two connected sections, means so connecting one section of the drive shaft with the form shaft that the latter executes a cycle of operation during each revolution of the drive shaft, means for adjusting the last-mentioned means so as to vary the number of revolutions made by the form shaft during an operative cycle, means engageable with the form shaft for stopping rotation thereof and for locking it against rotation during a determinate interval of its operative cycle, cam means on the other section of the drive shaft for operating said last-mentioned means, and means for adjusting the drive shaft sections angularly, relatively of each other, whereby the cam means on one end of the drive shaft is coordinated with the adjustment of the driving connection between the other end of the drive shaft and the form shaft.

12. In apparatus for winding tire beads, the combination of a rotatable shaft, means for effecting cyclic operation thereof, each operative cycle comprising a rotative phase and a stationary phase, a form on said shaft upon which a tire bead is built, a spring-pressed gripper on the form for engaging the leading end of a bead wire from which the tire bead is built, and means journaled on said form shaft and movable angularly relatively thereof for releasing the gripper during the stationary phase of an operative cycle.

13. In apparatus for winding tire beads, the combination of a rotatable shaft, a form on said shaft upon which a tire bead is built, a spring-pressed gripper on the form for engaging the leading end of a bead wire from which the tire bead is built, a constantly rotating drive shaft, means connecting the drive shaft with the form shaft to effect cyclic operation of the latter, each cycle of which consists of a rotative phase and a stationary phase, means on the form shaft controlling operation of said gripper, and means on the drive shaft for operating said last-mentioned means in timed relation to the operation of the form shaft.

14. In apparatus for winding tire beads, the combination of a rotatable shaft, a form on said shaft upon which a tire bead is built, a spring-pressed gripper on the form for engaging the leading end of a bead wire from which the tire bead is built, a constantly rotating drive shaft, means connecting the drive shaft with the form shaft to effect cyclic operation of the latter, each cycle consisting of a rotative phase and a stationary phase, a cam journaled on the form shaft controlling operation of the said gripper, and means on the drive shaft for effecting rotation of said cam to release the gripper during the stationary phase of form shaft operation.

15. In apparatus for winding tire beads, the combination of a rotatable annular form upon which a bead is built, means for effecting cyclic operation thereof, each cycle consisting of a rotative phase and a stationary phase, and means for ejecting bead units from the form, while the latter is stationary, in such a manner that the bead is determinately obliquely disposed with relation to the form as it leaves the latter.

16. In apparatus for winding tire beads, the combination of a rotatable annular form upon which tire beads are built, means for effecting cyclic operation thereof, each cycle consisting of a rotative phase and a stationary phase, and means for ejecting bead units from the form while the latter is stationary, said ejecting means being so constructed and arranged as to move the bead laterally off the form progressively from its top toward its bottom.

17. In apparatus for winding tire beads, the combination of a rotatable annular form upon which tire beads are built, means for effecting cyclic operation thereof, each cycle consisting of a rotative phase and a stationary phase, a circumferential series of ejector fingers positioned at the rear of the form and adapted to move across the perimeter of the form to eject bead units therefrom, and means for so moving said ejector fingers, in succession, progressively from the top of the form to the bottom thereof while the form is stationary.

18. In apparatus for winding tire beads, the combination of a rotatable annular form, means for periodically rotating the same to build tire beads thereon, a circumferential series of pivotally mounted ejector fingers at the rear of said form, said fingers being of arcuate shape and their free ends being adapted to move across the perimeter of the form to eject bead units therefrom, and means for engaging and so moving said fingers, said means making contact with the respective fingers progressively toward their respective pivots whereby the angular movement of the fingers has progressively increasing speed.

19. In apparatus for winding tire beads, the combination of a rotatable annular form, means for periodically rotating the same to build tire beads thereon, a circumferential series of ejector fingers normally positioned at the rear of the form, said fingers being adapted to move across the perimeter of the form to eject bead units therefrom, a pivotally mounted member adapted to engage the ejector fingers for moving them across the form, and means for angularly moving said pivotally mounted member in timed relation to the periodic operation of the form so as to engage and move said ejector fingers.

20. A combination as defined in claim 19 in which the ejector fingers are pivotally mounted upon the form.

21. In apparatus for winding tire beads, the combination of a rotatable shaft, a form on said shaft upon which tire beads are built, a circumferential series of ejector fingers normally positioned at the rear of the form and adapted to move across the perimeter of the form to eject bead units therefrom, a constantly rotating drive shaft, means connecting the drive shaft with the form shaft to effect cyclic operation of the latter, each cycle consisting of a rotative phase and a stationary phase, and means for translating power from the drive shaft to the ejector fingers for moving the latter in timed relation with the operation of the form shaft.

22. In apparatus for winding tire beads, the combination of a rotatable shaft, a form on said shaft upon which tire beads are built, a circumferential series of ejector fingers pivotally mounted upon the form and adapted to move across the perimeter thereof to eject bead units therefrom, a pivotally mounted frame behind the form adapted to move angularly to engage the ejector fingers in succession and move them across the form, a constantly rotating drive shaft, means connecting the drive shaft with the form shaft to effect cyclic operation of the latter, each cycle consisting of a rotative phase and a stationary phase, and means on the form shaft for angularly moving the pivoted ejector frame in synchronism with the phases of operation of the form shaft.

23. A combination as defined in claim 22 including means for adjusting the position of the pivoted ejector frame to adapt it for use with forms of different sizes.

24. In apparatus for winding tire beads, the combination of a rotatable annular form, means for feeding a bead wire thereto, means for gripping the leading end of the bead wire, means for pressing the bead wire onto the form as it is drawn thereonto by rotation of the form, means for severing the bead wire, means for ejecting the bead from the form, a constantly rotating drive shaft, means whereby said drive shaft effects periodic rotation of said form, and means for mechanically translating the power of the rotating shaft to the other mentioned mechanisms to effect operation thereof automatically in determinate time relation with the operation of the form.

25. In apparatus for winding tire beads, the combination of an annular form, a constantly rotating drive shaft, means on the drive shaft for effecting cyclic operation of the form, each cycle consisting of a rotative phase and a stationary phase, means for feeding the leading end of a bead tape to the form during the stationary phase of the latter, and mechanical means for translating power from the drive shaft to the tape feeding means to operate the latter.

26. In apparatus for winding tire beads, the combination of a periodically rotating, annular form, and means for feeding the leading end of a bead wire to said form between its periods of rotation, said means comprising a slide carrying a wire-gripping mechanism, a rotary cam arranged to propel the slide toward and away from the form, and means engaging the cam adapted to multiply the movement produced thereby and transmit it to the slide.

27. In apparatus of the character described, the combination of a rotatable form, a constantly rotating drive shaft, means connecting the latter and the form to effect cyclic operation of the form, each cycle comprising a rotative phase and a stationary phase, means for feeding the leading end of a bead wire to the form while the latter is stationary, a cam shaft controlling the operation of said wire feeding means, and means connecting the cam shaft to the drive shaft so that the said shafts rotate at the same angular speed.

28. In apparatus of the character described, the combination of a rotatable form, a constantly rotating drive shaft, driving means mechanically connecting the drive shaft to the form to effect periodic rotation of the latter to draw a bead wire onto the form, a spring-operated cutter for severing the bead wire, cam means for actuating said cutter while the form is not in motion, and means connecting the cam with the drive shaft for driving the cam at the same angular speed as the latter.

29. In apparatus of the character described, the combination of a rotatable form, a constantly rotating drive shaft, means connecting the drive shaft to the form to effect periodic rotation of the latter to draw a bead wire onto the perimeter of the form, a yieldingly urged cutter adapted to sever said bead wire, a cam shaft, means for driving the same at the same angular speed as the drive shaft, means on the cam shaft for latching the cutter in inoperative position, and means on the cam shaft for releasing the latching means to permit the yielding means to operate the cutter.

30. In apparatus of the character described, the combination of a rotatable form, means for guiding a continuous bead wire to said form, said means comprising a die through which the bead wire passes, a pivotally mounted cutter arm movable angularly in the plane of the bead wire, means for operating said cutter arm at determinate intervals, and a blade yieldingly mounted on the free end of the cutter arm for cooperation with said die in severing the bead wire.

31. In apparatus of the character described, the combination of a rotatable form, a constantly rotating drive shaft, means connecting the drive shaft with the form to effect periodic rotation of the latter to draw a bead wire onto the perimeter of the form, a presser roller normally yieldingly urged against the perimeter of the form, and means for translating the power of said drive shaft mechanically to the presser roller for lifting and lowering the latter relatively of the form in timed relation to the operation of said form.

32. In apparatus of the character described, the combination of a rotatable form, means for periodically rotating said form, gripper means on the form for engaging the leading end of a bead wire fed to the form, a presser roller normally yieldingly urged against the perimeter of the form, means for lifting and lowering the presser roller relatively of the form in timed relation to the operation of the form, and guide means for accurately positioning the leading end of the bead wire so that it may be engaged by said gripper means, said guide means being associated with the presser roller and operated concurrently therewith by the same means that operates the said presser roller.

33. In apparatus of the character described, the combination of a rotatable form, a constantly rotating drive shaft, means connecting said drive shaft to said form for periodically rotating the latter to draw a bead wire onto the perimeter thereof, a frame, bead wire feeding means on said frame, wire severing means on said frame, work pressing means on said frame, means for operating the mechanism on said frame from said drive shaft in synchronism with the operation of the form, and means for adjusting the position of the frame relatively of the form to adapt the mechanism on the frame to forms of different diameters.

34. In apparatus of the character described, the combination of a rotatable annular form, a constantly rotating drive shaft, means connecting the drive shaft and form to effect cyclic operation of the latter, each cycle of which comprises a rotative phase and a stationary phase, means for adjusting said drive connection to vary the number of revolutions of the form during an operative cycle, means for building a tire bead on the perimeter of the form and for ejecting the finished bead therefrom, said means operating in synchronism with the phases of operation of the form, and means for adjusting the timing of said bead building means in conformity with the number of revolutions of the form during its operative cycle.

35. In apparatus of the character described, the combination of a rotatable form upon which a tire bead is built, means for effecting cyclic operation of the form, each cycle comprising a rotative phase and a stationary phase, the form always stopping in the same angular position during normal operation, a plurality of mechanisms operating upon the work during the intervals that the form is stationary, and means automatically preventing operation of said mechanisms when the form stops at other than its proper angular position.

36. In apparatus for winding tire beads, the combination of a rotatable form upon which the bead is built, a constantly rotating drive shaft, and mechanical driving mechanism operatively connecting said form and shaft for causing said form intermittently to rotate with a determinately graduated speed comprising relatively slow starting and stopping as compared to its intermediate speed.

FLORAIN J. SHOOK.